(12) United States Patent
Hazard

(10) Patent No.: US 8,705,549 B2
(45) Date of Patent: Apr. 22, 2014

(54) STRUCTURE AND IMPLEMENTATION OF UNIVERSAL VIRTUAL PRIVATE NETWORKS

(75) Inventor: Ludovic Hazard, Tourrettes-sur-Loup (FR)

(73) Assignee: International Business Machines Corporation, Armonk, NY (US)

( * ) Notice: Subject to any disclaimer, the term of this patent is extended or adjusted under 35 U.S.C. 154(b) by 1616 days.

(21) Appl. No.: 12/060,900

(22) Filed: Apr. 2, 2008

(65) Prior Publication Data

US 2008/0250492 A1    Oct. 9, 2008

(30) Foreign Application Priority Data

Apr. 6, 2007    (FR) .................................... 07 300930

(51) Int. Cl.
*H04L 12/28* (2006.01)

(52) U.S. Cl.
USPC .......................................... 370/419; 710/316

(58) Field of Classification Search
USPC ............ 370/419, 392, 395.31, 389, 390, 400; 709/223, 238; 726/15
See application file for complete search history.

(56) References Cited

U.S. PATENT DOCUMENTS

| | | | |
|---|---|---|---|
| 7,421,487 B1 * | 9/2008 | Peterson et al. ............... | 709/223 |
| 7,643,486 B2 | 1/2010 | Belz et al. | |
| 8,040,896 B2 * | 10/2011 | Nguyen et al. ........... | 370/395.31 |
| 8,089,967 B2 | 1/2012 | Hazard | |
| 8,135,013 B2 | 3/2012 | Hazard | |
| 8,144,709 B2 | 3/2012 | Hazard | |
| 2003/0041170 A1 * | 2/2003 | Suzuki .......................... | 709/238 |
| 2003/0101243 A1 | 5/2003 | Donahue et al. | |
| 2003/0110344 A1 | 6/2003 | Szczepanek et al. | |
| 2004/0066781 A1 * | 4/2004 | Shankar et al. ............... | 370/389 |
| 2004/0128389 A1 | 7/2004 | Kopchik | |
| 2005/0053079 A1 * | 3/2005 | Havala .......................... | 370/400 |

(Continued)

FOREIGN PATENT DOCUMENTS

| | | |
|---|---|---|
| GB | 2381922 A | 5/2003 |
| WO | WO03/105406 A1 | 12/2003 |
| WO | WO2004/036447 A1 | 4/2004 |

OTHER PUBLICATIONS

Notice of Allowance (Mail Date Dec. 6, 2011) for U.S. Appl. No. 12/058,786, filed Mar. 31, 2008.

(Continued)

*Primary Examiner* — Dang T Ton
*Assistant Examiner* — Lionel Preval
(74) *Attorney, Agent, or Firm* — Schmeiser, Olsen & Watts, LLP; John Pivnichny

(57) ABSTRACT

A Universal Virtual Private Network (VPN) apparatus, and method and system for using universal VPNs. The Universal VPNs include a first Internet Protocol (IP) switch connected to a second IP switch by a public telecommunications medium. Each IP switch has an interswitch port and access ports to which hosts are directly connected. A virtual private line services (VPLS) packet received by the first IP switch from a source host directly connected to an access port of the first IP switch is routed by the first IP switch to destination hosts of a universal VPN attached to access ports of the first and second IP switches via respective transmission paths that use a VPLS transmission protocol throughout each respective transmission path. The VPLS packet includes a header appended to an IP frame including a packet payload including a first message, the header including a VPN label identifying the universal VPN.

24 Claims, 15 Drawing Sheets

(56) References Cited

U.S. PATENT DOCUMENTS

| | | | |
|---|---|---|---|
| 2005/0097610 A1 | 5/2005 | Pedlow, Jr. et al. | |
| 2005/0122825 A1 | 6/2005 | Tzeng | |
| 2005/0249199 A1 | 11/2005 | Albert et al. | |
| 2006/0080421 A1* | 4/2006 | Hu | 709/223 |
| 2007/0047546 A1 | 3/2007 | Deguchi et al. | |
| 2007/0121617 A1 | 5/2007 | Kanekar et al. | |
| 2007/0140250 A1* | 6/2007 | McAllister et al. | 370/392 |
| 2008/0130490 A1 | 6/2008 | Yu et al. | |
| 2008/0172732 A1* | 7/2008 | Li et al. | 726/15 |
| 2008/0247395 A1 | 10/2008 | Hazard | |
| 2008/0247396 A1 | 10/2008 | Hazard | |
| 2008/0247399 A1 | 10/2008 | Hazard | |
| 2009/0196289 A1* | 8/2009 | Shankar et al. | 370/390 |
| 2010/0034200 A1 | 2/2010 | MeLampy et al. | |
| 2010/0189105 A1 | 7/2010 | Wentink | |

OTHER PUBLICATIONS

Non-final Office Action (Mail Date Mar. 30, 2010) for U.S. Appl. No. 12/060,304, filed Apr. 1, 2008.

Response (File Date Jun. 28, 2010) to Non-final Office Action (Mail Date Mar. 30, 2010) for U.S. Appl. No. 12/060,304, filed Apr. 1, 2008.

Notice of Allowance (Mail Date Jun. 22, 2011) for U.S. Appl. No. 12/060,304, filed Apr. 1, 2008.

Non-Final Office Action (Mail Date Dec. 8, 2009) for U.S. Appl. No. 12/058,786, filed Mar. 31, 2008.

Response (File Date Mar. 3, 2010) to Non-Final Office Action (Mail Date Dec. 8, 2009) for U.S. Appl. No. 12/058,786, filed Mar. 31, 2008.

Non-Final Office Action (Mail Date Jun. 1, 2010) for U.S. Appl. No. 12/058,786, filed Mar. 31, 2008.

Response (File Date Aug. 30, 2010) to Non-Final Office Action (Mail Date Jun. 1, 2010) for U.S. Appl. No. 12/058,786, filed Mar. 31, 2008.

Final Office Action (Mail Date Dec. 9, 2010) for U.S. Appl. No. 12/058,786, filed Mar. 31, 2008.

Response (File Date Feb. 7, 2011) to Final Office Action (Mail Date Dec. 9, 2010) for U.S. Appl. No. 12/058,786, filed Mar. 31, 2008.

Advisory Action (Mail Date Feb. 24, 2011) for U.S. Appl. No. 12/058,786, filed Mar. 31, 2008.

Appeal Brief (File Date Apr. 25, 2011) for U.S. Appl. No. 12/058,786, filed Mar. 31, 2008.

Non-Final Office Action (Mail Date Jul. 19, 2011) for U.S. Appl. No. 12/058,786, filed Mar. 31, 2008.

Non-Final Office Action (Mail Date Nov. 24, 2009) for U.S. Appl. No. 12/057,486, filed Mar. 28, 2008.

Response (File Date Feb. 24, 2010) to Non-Final Office Action (Mail Date Nov. 24, 2009) for U.S. Appl. No. 12/057,486, filed Mar. 28, 2008.

Non-Final Office Action (Mail Date May 25, 2010) for U.S. Appl. No. 12/057,486, filed Mar. 28, 2008.

Response (File Date Aug. 23, 2010) to Non-Final Office Action (Mail Date May 25, 2010) for U.S. Appl. No. 12/057,486, filed Mar. 28, 2008.

Non-Final Office Action (Mail Date Nov. 9, 2010) for U.S. Appl. No. 12/057,486, filed Mar. 28, 2008.

Response (File Date Jan. 10, 2011) to Non-Final Office Action (Mail Date Nov. 9, 2010) for U.S. Appl. No. 12/057,486, filed Mar. 28, 2008.

Final Office Action (Mail Date Mar. 18, 2011) for U.S. Appl. No. 12/057,486, filed Mar. 28, 2008.

Request for Continued Examination (Filed Aug. 1, 2011) for U.S. Appl. No. 12/060,304, filed Apr. 1, 2008.

Notice of Allowance (Mail Date Aug. 15, 2011) for U.S. Appl. No. 12/060,304, filed Apr. 1, 2008.

Request for Continued Examination (Filed Aug. 18, 2011) for U.S. Appl. No. 12/057,486, filed Mar. 28, 2008.

Notice of Allowance (Mail Date Nov. 10, 2011) for U.S. Appl. No. 12/057,486, filed Mar. 28, 2008.

* cited by examiner

| VLAN₁ – VLAN₃ | Virtual Local Area Networks |

| S₁ – S₂ | Switches |

STRUCTURE AND IMPLEMENTATION OF UNIVERSAL VIRTUAL PRIVATE NETWORKS

FIELD OF THE INVENTION

The present invention relates to a universal virtual private network and a method and computer program for implementing a universal virtual private network.

BACKGROUND OF THE INVENTION

The Internet is made of a combination of physical networks connected together by internetworking devices such as routers and gateways. Referring to FIG. 1, let the Internet 1 comprise routers $R_1$, $R_2$, $R_3$ and $R_4$ connected by transmission lines $L_1$, $L_2$, $L_3$, $L_4$ and $L_5$. Let individual computers (hosts) $D_1$ and $D_2$ be connected to the Internet 1 through routers $R_1$ and $R_4$ respectively. Similarly, let a local area network (LAN) 2 comprise hosts $D_3$ to $D_6$ connected to a LAN switch S, which in turn is connected to the Internet through router $R_2$.

In a typical scenario, a host generates a message (e.g. a request or response) for transmission on the Internet 1. The message is processed by a transport layer, which adds a header and passes the resulting packet to a network layer. The network layer adds its own header (including the logical addresses of the source and destination computers) to form a network layer packet (e.g. an IP packet). The packet is then sent to a data link layer, which adds its own header (comprising the physical addresses of the source and destination hosts) and checksum and passes the resulting frame to a physical layer at which point the host (e.g. D1) transmits the frame to the nearest router (e.g. R1).

On receipt of a frame, a router (e.g. $R_1$) strips the header and trailer from the frame and passes the packet located in the frame's payload to routing software. The routing software uses the packet header to choose an output line from the current router to forward the packet to the nearest router (e.g. $R_2$, $R_3$). This process is continued so that the packet is progressively moved through the Internet to its desired destination.

A virtual private network (VPN) is a private network that makes use of a public telecommunication infrastructure (e.g. the Internet), to connect sites or users together. There are two main classes of VPNs in use today, namely:

(a) a Layer 2 Ethernet VPN using the 802.1Q trunking protocol; and (b) a Layer 2 VPN using the Multi-Protocol Labelling Standard (MPLS)/Virtual Private Line Services (VPLS) standard.

A layer 2 (L2) Ethernet VPN is used for connecting hosts that are geographically located close together (e.g. hosts in a same building). These VPNs are operated under the Ethernet protocol (with the 802.IQ trunking protocol). Thus, these VPNs are subject to the transmission distance restrictions of the Ethernet protocol. For example, a layer 2 Ethernet VPN could not be used to connect a host located in Glasgow, to a host located in Paris.

In contrast, wide area networks (WANs) permit the connection of hosts located for apart. For example, a layer 2 VPN employing the VPLS protocol encapsulates Ethernet frames in VPLS frames and transmits the resulting VPLS frames on a WAN.

Nonetheless, there remains a complete separation between the two different types of networks and the nature of the communications on each. For simplicity and clarity, an $L_2$ Ethernet VPN will be known henceforth as a short range VPN. Similarly, an $L_2$ VPN employing the VPLS protocol will be known as a long range VPN.

SUMMARY OF THE INVENTION

The present invention provides a universal Virtual Private Network (VPN) apparatus, comprising:

a first Internet Protocol (IP) switch, said first IP switch connected to a second IP switch, each IP switch independently comprising multiple ports comprising a plurality of access ports and an interswitch port, wherein each access port of each IP switch is identified by a port identifier and directly connected to a corresponding host;

wherein the interswitch port of the first IP switch is connected to the interswitch port of the second IP switch via a communication path in a public telecommunications medium;

wherein the first IP switch is configured to receive a first virtual private line services (VPLS) packet from a first source host at a first access port of the first IP switch to which the first source host is directly connected and to transmit the first VPLS packet to a first destination host directly connected to a second access port of the first IP switch via a first transmission path using a VPLS transmission protocol throughout the first transmission path, said first source and said first destination host both being registered members of a first universal VPN, said first VPLS packet comprising a first IP frame comprising a first packet payload having a first message therein;

wherein the first IP switch is configured receive a second VPLS packet from a second source host at a third access port of the first IP switch to which the second source host is directly connected and to transmit the second VPLS packet to the second IP switch via a second transmission path using the VPLS transmission protocol throughout the second transmission path to enable the second IP switch to subsequently transmit the second VPLS packet to a second destination host connected to a fourth access port of the second IP switch via a third transmission path using the VPLS transmission protocol throughout the third transmission path, said second transmission path including the public communication path, said second source host and said second destination host both being registered members of a same universal VPN, said second VPLS packet comprising a second IP frame comprising a second packet payload having a second message therein.

The present invention provides a method for transmitting a virtual private line services (VPLS) packet to destinations relating to at least one universal Virtual Private Network (VPN), said method comprising:

a first Internet Protocol (IP) switch receiving a first VPLS packet from a first source host at a first access port of the first IP switch to which the first source host is directly connected, wherein the first IP switch is connected to a second IP switch, wherein each IP switch independently comprises multiple ports comprising a plurality of access ports and an interswitch port, wherein each access port of each IP switch is identified by a port identifier and directly connected to a corresponding host, wherein the interswitch port of the first IP switch is connected to the interswitch port of the second IP switch via a communication path in a public telecommunications medium, wherein the plurality of access ports of the first IP switch comprises the first access port, wherein the first source host is a registered member of a first universal VPN, wherein the first VPLS packet comprises a header appended to a first IP frame comprising a packet payload having a first message therein, said header comprising a first VPN label identifying the first universal VPN;

after said receiving the first VPLS packet, said first IP switch reading the first VPN label from the first IP frame to identify the first universal VPN;

after said reading the first VPN label to identify the first universal VPN, said first IP switch identifying a plurality of ports comprising the interswitch port of the second IP switch and at least one access port of the first IP switch such that the plurality of ports is connected to a plurality of destination hosts which are registered members of the first universal VPN;

after said identifying the plurality of ports, said first IP switch transmitting the first VPLS packet to each port of the plurality of ports via a corresponding transmission path, using a VPLS transmission protocol throughout each corresponding transmission path.

The present invention provides a computer program product comprising a storage medium having computer readable program code stored therein, said program code configured to be executed by a computer to cause the computer to perform a method for transmitting a virtual private line services (VPLS) packet to destinations relating to at least one universal Virtual Private Network (VPN), said method comprising:

a first Internet Protocol (IP) switch receiving a first VPLS packet from a first source host at a first access port of the first IP switch to which the first source host is directly connected, wherein the first IP switch is connected to a second IP switch, wherein each IP switch independently comprises multiple ports comprising a plurality of access ports and an interswitch port, wherein each access port of each IP switch is identified by a port identifier and directly connected to a corresponding host, wherein the interswitch port of the first IP switch is connected to the interswitch port of the second IP switch via a communication path in a public telecommunications medium, wherein the plurality of access ports of the first IP switch comprises the first access port, wherein the first source host is a registered member of a first universal VPN, wherein the first VPLS packet comprises a header appended to a first IP frame comprising a packet payload having a first message therein, said header comprising a first VPN label identifying the first universal VPN;

after said receiving the first VPLS packet, said first IP switch reading the first VPN label from the first IP frame to identify the first universal VPN;

after said reading the first VPN label to identify the first universal VPN, said first IP switch identifying a plurality of ports comprising the interswitch port of the second IP switch and at least one access port of the first IP switch such that the plurality of ports is connected to a plurality of destination hosts which are registered members of the first universal VPN;

after said identifying the plurality of ports, said first IP switch transmitting the first VPLS packet to each port of the plurality of ports via a corresponding transmission path, using a VPLS transmission protocol throughout each corresponding transmission path.

The present invention provides a system comprising a computer configured to execute program code stored in a storage medium to perform a method for transmitting a virtual private line services (VPLS) packet to destinations relating to at least one universal Virtual Private Network (VPN), said method comprising:

a first Internet Protocol (IP) switch receiving a first VPLS packet from a first source host at a first access port of the first IP switch to which the first source host is directly connected, wherein the first IP switch is connected to a second IP switch, wherein each IP switch independently comprises multiple ports comprising a plurality of access ports and an interswitch port, wherein each access port of each IP switch is identified by a port identifier and directly connected to a corresponding host, wherein the interswitch port of the first IP switch is connected to the interswitch port of the second IP switch via a communication path in a public telecommunications medium, wherein the plurality of access ports of the first IP switch comprises the first access port, wherein the first source host is a registered member of a first universal VPN, wherein the first VPLS packet comprises a header appended to a first IP frame comprising a packet payload having a first message therein, said header comprising a first VPN label identifying the first universal VPN;

after said receiving the first VPLS packet, said first IP switch reading the first VPN label from the first IP frame to identify the first universal VPN;

after said reading the first VPN label to identify the first universal VPN, said first IP switch identifying a plurality of ports comprising the interswitch port of the second IP switch and at least one access port of the first IP switch such that the plurality of ports is connected to a plurality of destination hosts which are registered members of the first universal VPN;

after said identifying the plurality of ports, said first IP switch transmitting the first VPLS packet to each port of the plurality of ports via a corresponding transmission path, using a VPLS transmission protocol throughout each corresponding transmission path.

DETAILED DESCRIPTION OF THE INVENTION

A. Ethernet Protocol

Figure 2:
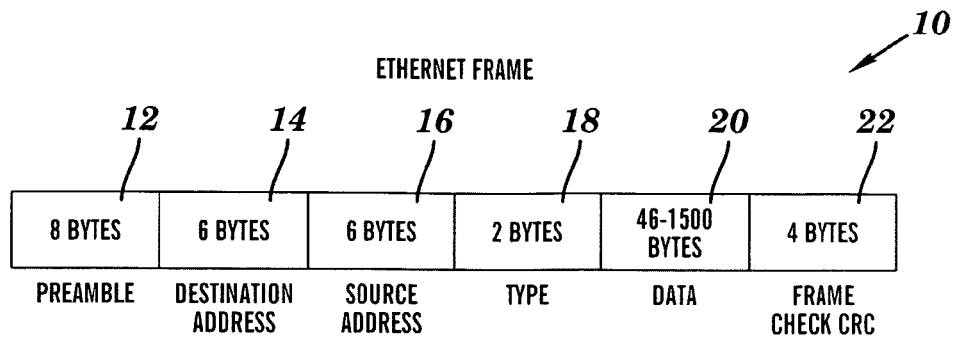
FIG. 2 is a block diagram of a conventional Ethernet frame.

Referring to FIG. 2, an Ethernet frame 10 comprises an eight byte preamble 12 (used to identify the start of a frame) and two Medium Access Channel (MAC) addresses 14, 16, the first of which specifies the address of the destination of the frame (i.e. the destination address 14) and the second specifies the address of the source of the frame (i.e. the source address 16).

Following the destination and source addresses 14, 16, the frame 10 comprises a frame type identifier 18 and a payload within a data field 20. The data field 20 is of 46 to 1500 bytes long. The upper limit of 1500 bytes is based on the physical limitations of cables available when the Ethernet protocol was first developed. However, subsequent developments in cabling technologies mean that this limitation no longer applies. Nonetheless, the Ethernet protocol has not kept up with these developments. The data field 20 is followed by a four byte cyclic redundancy check (CRC) field 22, which is used to detect errors in the frame 10.

B. Internet Protocol

Figure 3A:
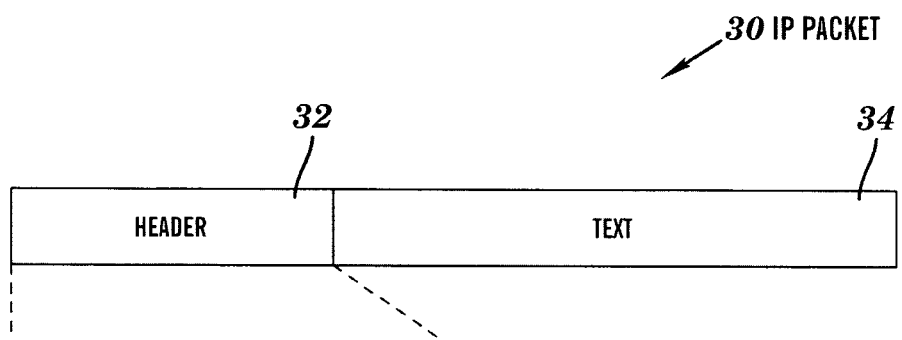
FIG. 3A is a block diagram of a conventional IP packet.
Figure 3B:
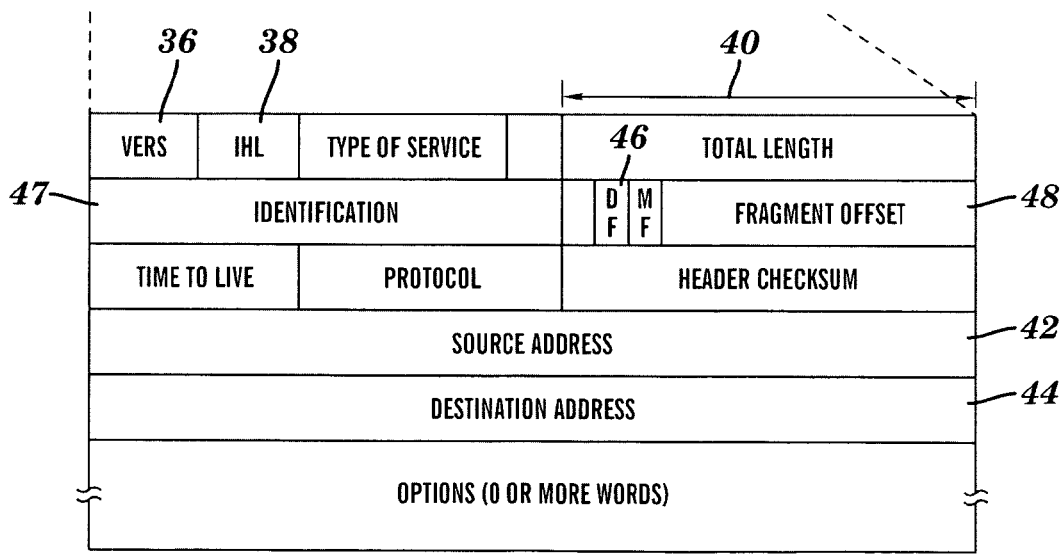
FIG. 3B is a block diagram of a header in a conventional IP packet of FIG. 3A.

The Internet protocol is a network layer protocol in which data is transmitted in the form of packets. Referring to FIG. 3A, an IP packet 30 comprises a header portion 32 (of variable length between 20-24 octets) and a text portion 34, which contains the data payload. Referring to FIG. 3B, the header portion 32 comprises fields: version 36, Internet Header Length (IHL) 38, and field 40 which specifies type of service and total length of the packet. The header portion 32 specifies inter alia the IP address of the source of the IP packet 30 (i.e. an IP source address 42) and the IP address of the intended destination of the IP packet 30 (i.e. an IP destination address 44).

An IP address encodes the network number and host number of every host and router on the Internet. An IP address can be set statically or dynamically via the Dynamic Host Configuration Protocol (DHCP). To obtain an IP address by DHCP, a newly booted computer broadcasts a DHCP discover packet. If a DHCP server receives the DHCP discover packet, it will check in its DHCP database and assign an available IP address thereto. The DHCP server will then return the DHCP address to the MAC-address of the requesting computer.

While an IP packet can be up to 64 Kbytes long, the data field of an Ethernet frame is only 1500 bytes long. Thus, to transmit a large IP packet under the Ethernet protocol, it may be necessary to divide the IP packet into a plurality of fragments that are small enough to be transmitted within an Ethernet frame. On reaching a given destination, the fragments are re-assembled to form the original payload of the IP packet. To facilitate the fragmentation process, an IP packet header 32 comprises a Don't Fragment (DF) flag 46 (which indicates whether or not the packet 30 may be fragmented), More Fragment (MF) flag, a fragment offset 48, and an identification field 47 which identifies fragments derived from the same IP packet.

C. Traffic Routing Devices

C.1 LAN Switch

Figure 4:
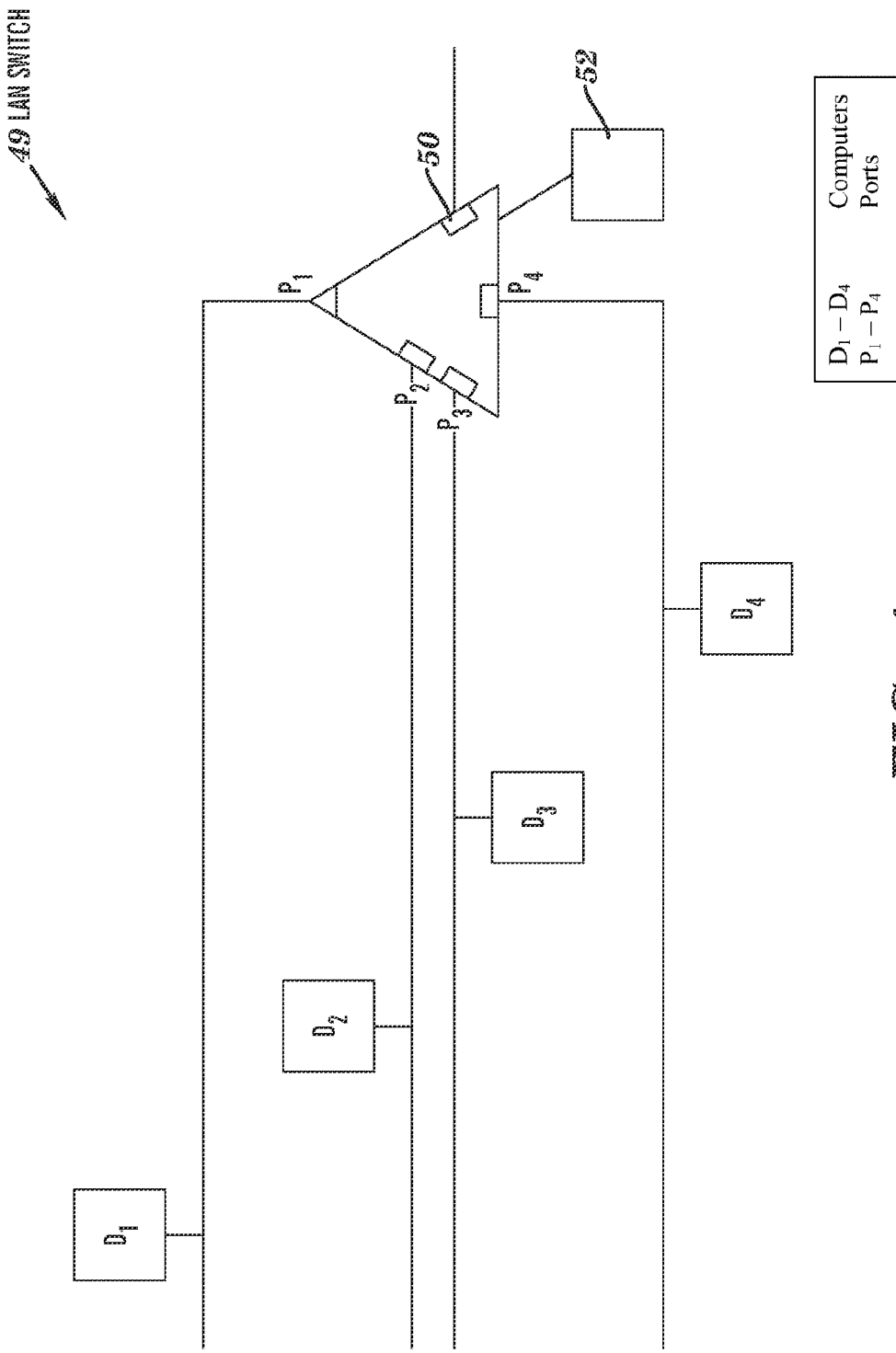
FIG. 4 is a block diagram of a conventional LAN switch.

Referring to FIG. 4, a LAN switch 49 comprises a plurality of ports $P_1$-$P_4$, each of which is connectable to a LAN segment and associated computers $D_1$-$D_4$. The LAN switch 49 further comprises a high speed port 50 which connects the LAN switch 49 to other computers in the network.

When a LAN switch 49 first starts up and the computers $D_1$-$D_4$ connected thereto request services from other computers, the switch 49 builds a table (known as MAC table) 51 that associates the MAC address of each local computer $D_1$-$D_4$ connected thereto, with the number of the port $P_1$-$P_4$ through which the computer is reachable. This ensures that if computer $D_1$ (connected to port $P_1$) needs to transmit to computer $D_2$ (connected to port $P_2$) the LAN switch 49 forwards the frames directly to the relevant ports (i.e. from port $P_1$ to port $P_2$), thereby sparing computers $D_3$, $D_4$ connected to the other ports ($P_3$, $P_4$) from having to respond to the frames intended for the computer $D_2$. Similarly, if computer $D_3$ needs to send data to computer $D_4$ at the same time that computers $D_1$ and $D_2$ are communicating, the LAN switch 49 will forward frames from port $P_3$ to port $P_4$ at the same time as it forwards frames from port $P_1$ to port $P_2$.

A switch directs a frame to an appropriate port by:

(a) determining the destination MAC address of the frame;

(b) comparing the destination MAC address with the addresses listed in the MAC table;

(c) finding a port number that corresponds with the destination MAC address; and (d) transmitting the frame through the relevant port.

If a LAN switch 49 receives a frame comprising a destination MAC address that is not listed in the switch's MAC table 52, the LAN switch 49 sends the (unicast) frame out through all of its ports (excluding the port from the frame originated) in a technique known as unicast flooding. On receipt of the packet, the destination host transmits an acknowledgement packet to the switch. The switch then adds the relevant MAC address (from the acknowledgement packet) to its MAC table 52.

The LAN switch's MAC table 52 is populated statically or by a dynamic learning process. In the dynamic learning process, the LAN switch 49 compares an incoming frame's source address with the MAC addresses stored in the switch's MAC table 52. If the source MAC address is not listed in the switch's MAC table 52, the port number from which the frame was received and the frame's source MAC address are added to the MAC table 52. The dynamic learning process may be conducted every time a frame is received, so that a movement of a computer to another port is automatically detected and the switch's MAC table 52 reconfigured accordingly. It is also possible to specify a lifetime for an entry in the switch's MAC table 52, wherein after the expiry of the lifetime, the entry is removed from the switch's MAC table 52 and must be relearned.

C.2 IP Router

IP routers also direct Internet traffic. On receipt of an incoming frame, an IP router strips off the frame's header and examines the remaining IP packet to determine its IP destination address. This information is used together with optimal route details stored in a routing table in the router to determine the output line on which to transmit the packet.

Routing protocols (e.g. OSPF (Open Shortest Path First) and RIP (Routing Information Protocol)) enable routers to advertise and learn the most efficient routes to a given destination, to allow the routers to dynamically build and populate their routing tables. OSPF operates by assigning a cost (e.g. distance, delay etc.) to each path in a network and using these costs to compute the shortest path between a router and other nearby routers. OSPF also exchanges routing information between adjacent routers. In use, a router floods a "hello" message through all of its ports to identify its neighbors and then establishes a neighbourhood with adjacent routers and exchanges costs and tables therewith.

C.3 Default Gateway

Returning to FIG. 1, a default gateway is usually a router ($R_2$) that enables an end-host (e.g. $D_3$) to forward IP packets to the outside world (outside its LAN 2). From the above discussions of the Internet Protocol and Ethernet Protocol, it can be seen that even if the IP address of the default-gateway ($R_2$) is configured on all of its hosts ($D_3$-$D_6$), the end-hosts ($D_3$-$D_6$) use the Address Resolution Protocol (ARP) to determine the MAC address corresponding to the default gateway's IP address and encapsulate IP packets in Ethernet frames comprising the default-gateway MAC-address.

D. Virtual Private Networks

Figure 5:
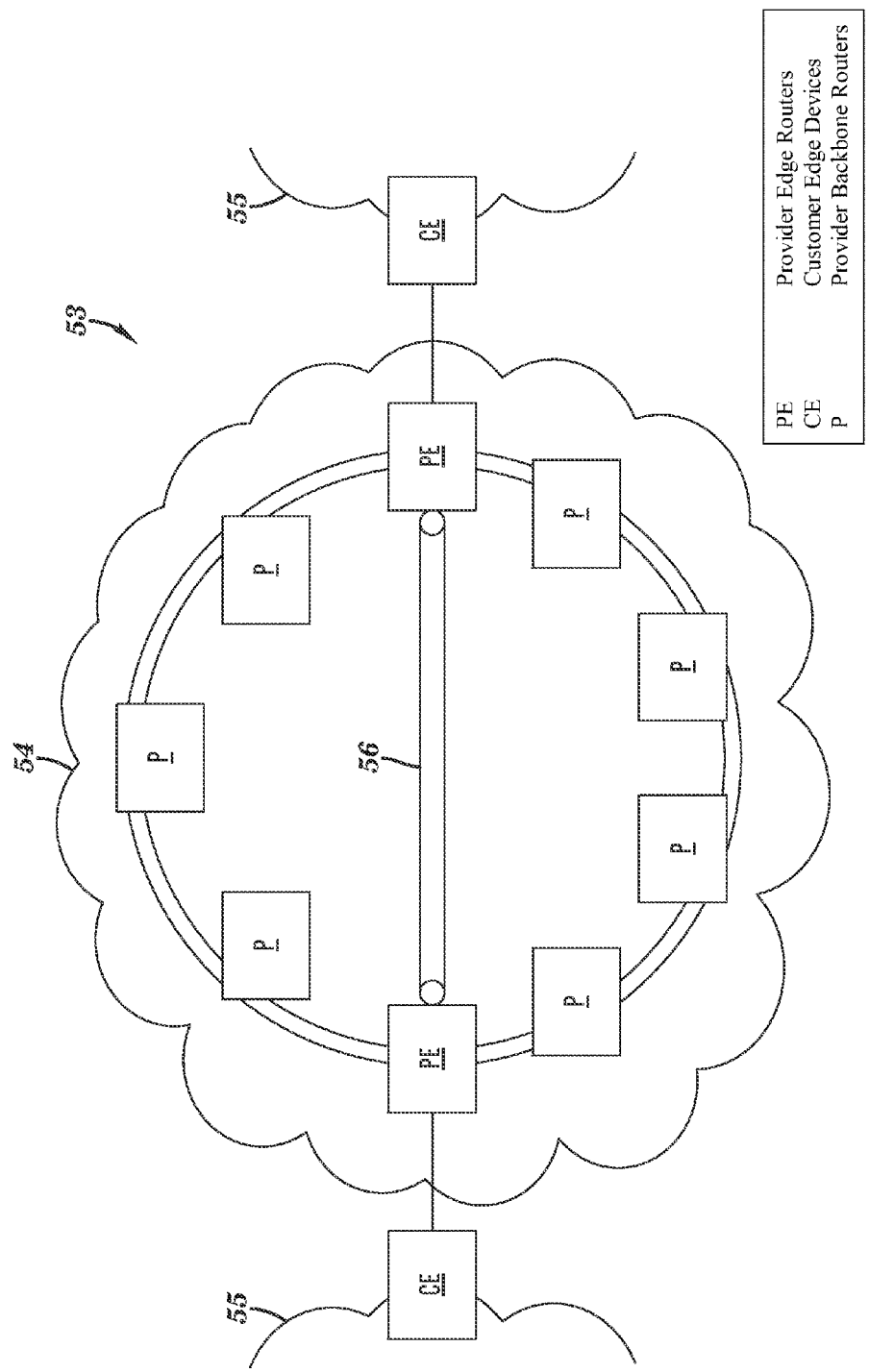
FIG. 5 is a block diagram of a generalised typical VPN topology.

A long-range virtual private network (VPN) is a private network that makes use of the public telecommunication infrastructure (e.g. the Internet), to connect remote sites or users together. A user/company that uses a VPN is known as a VPN customer. VPN service providers provide the facilities that construct and maintain a VPN. Referring to FIG. 5, a VPN 53 comprises two topological areas, namely a provider's network 54 and a customer's network 55. The customer's network 55 is private and commonly located at multiple physical sites. The provider's network 54, can run across the public Internet infrastructure (or most commonly on a dedicated global private network that exists in the public Internet infrastructure), comprises backbone routers that provide inter alia VPN services to the customer's network 55. In view of the potential sensitivity of the data transmitted therein, VPNs often use encryption and other security mechanisms to ensure that only authorized users can access the network and the data transmitted therein cannot be intercepted. This in effect, creates a secure "tunnel" between the points within the VPN.

VPNs 53 typically include the following network devices:

provider edge (PE) routers in the provider's network 54 that connect the service provider backbone to customer edge devices located at customer sites, wherein pairs of PE routers are connected through a tunnel 56;

provider (P) backbone routers within the core of the provider's network 54 that are not connected to any routers at a customer site but are part of the tunnel 56 between pairs of PE routers; and customer edge (CE) devices, which are routers or switches located at the customer site that connect to the provider's network.

There are two main classes of VPNs in use today, namely:

(a) Layer 2 Ethernet VPNs using the 802.1Q trunking standard; and (b) Layer 2 VPNs using the MPLS/VPLS standard.

However, there is no simple way of connecting the two classes of VPNs to produce a universal VPN including nearby and distant hosts.

D.1. Short-Range VPN (Virtual LAN (VLAN))

Figure 6:
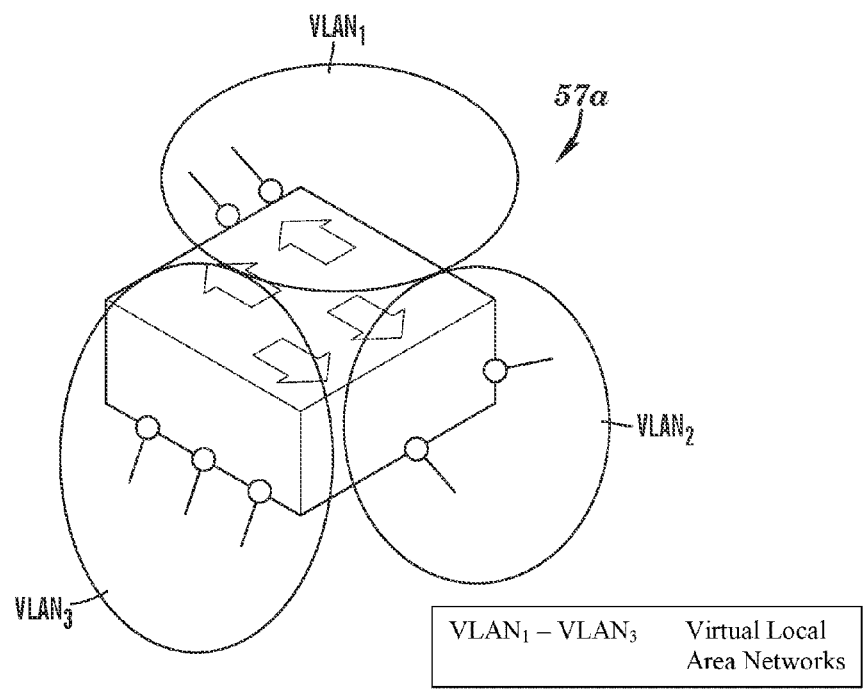
FIG. 6 is a block diagram of a LAN switch supporting multiple short range VPNs.

A VLAN is a network that is logically segmented on inter alia functional requirements rather than on a physical or geographical basis. Referring to FIG. 6, VLANs are based on specially-designed VLAN-aware switches 57a, one or more of whose ports are associated with a given VLAN, wherein packets are switched between ports associated with the same VLAN. A large network may comprise several VLAN-aware switches 57a wherein several ports on each switch are grouped together to form a large VLAN across the network.

Generally, a single port supports only the VLAN that it belongs to. Thus, an easy way of transmitting traffic for two VLANs ($VLAN_1$ and $VLAN_2$) between two LAN switches $S_1$ and $S_2$ would be to create two physical links between the switches, wherein each physical link is dedicated to the transmission of data for a single VLAN. However, this approach does not scale well, as the addition of further VLANs, requires the sacrifice of additional switch ports.

Figure 7:
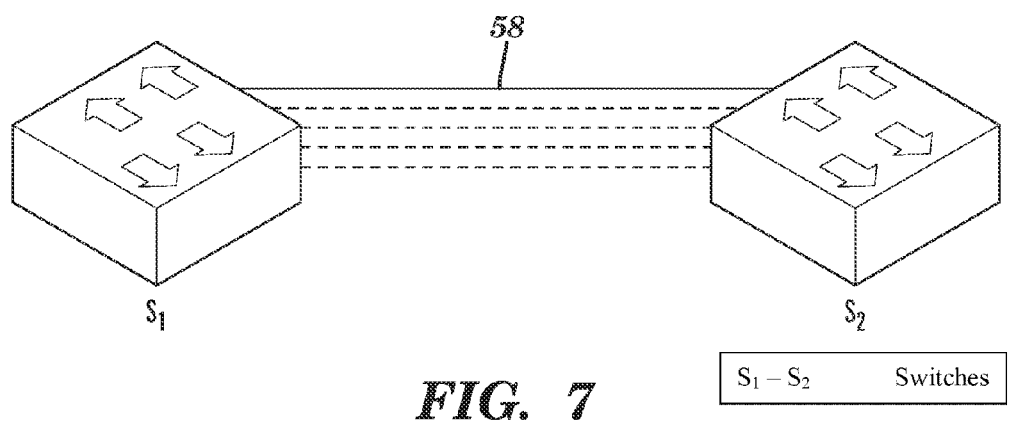
FIG. 7 is a block diagram of a conventional VLAN trunk between two LAN switches.

Referring to FIG. 7, a trunk 58 is a single physical point-to-point link that carries traffic for multiple VLANs and thereby allows VLANs to extend across an entire network. In other words, a trunk 58 bundles virtual links over one physical link thereby saving ports on the switches $S_1$ and $S_2$. The trunk 58 between the two switches $S_1$ and $S_2$ is able to carry traffic for any VLAN. However, to enable a VLAN (defined on one switch) to be recognized and linked to the same VLAN on other switches or routers, a trunking protocol (e.g. 802.1Q) must be configured.

A trunking protocol must perform frame tagging or frame encapsulation to identify traffic belonging to a particular VLAN. VLAN identifiers are added to Ethernet frames as they enter a port (of a LAN switch), and are maintained as the frames are transmitted across a trunk. The VLAN identifiers are removed from the frames prior to their transmission on a non-trunk link.

Figure 8:
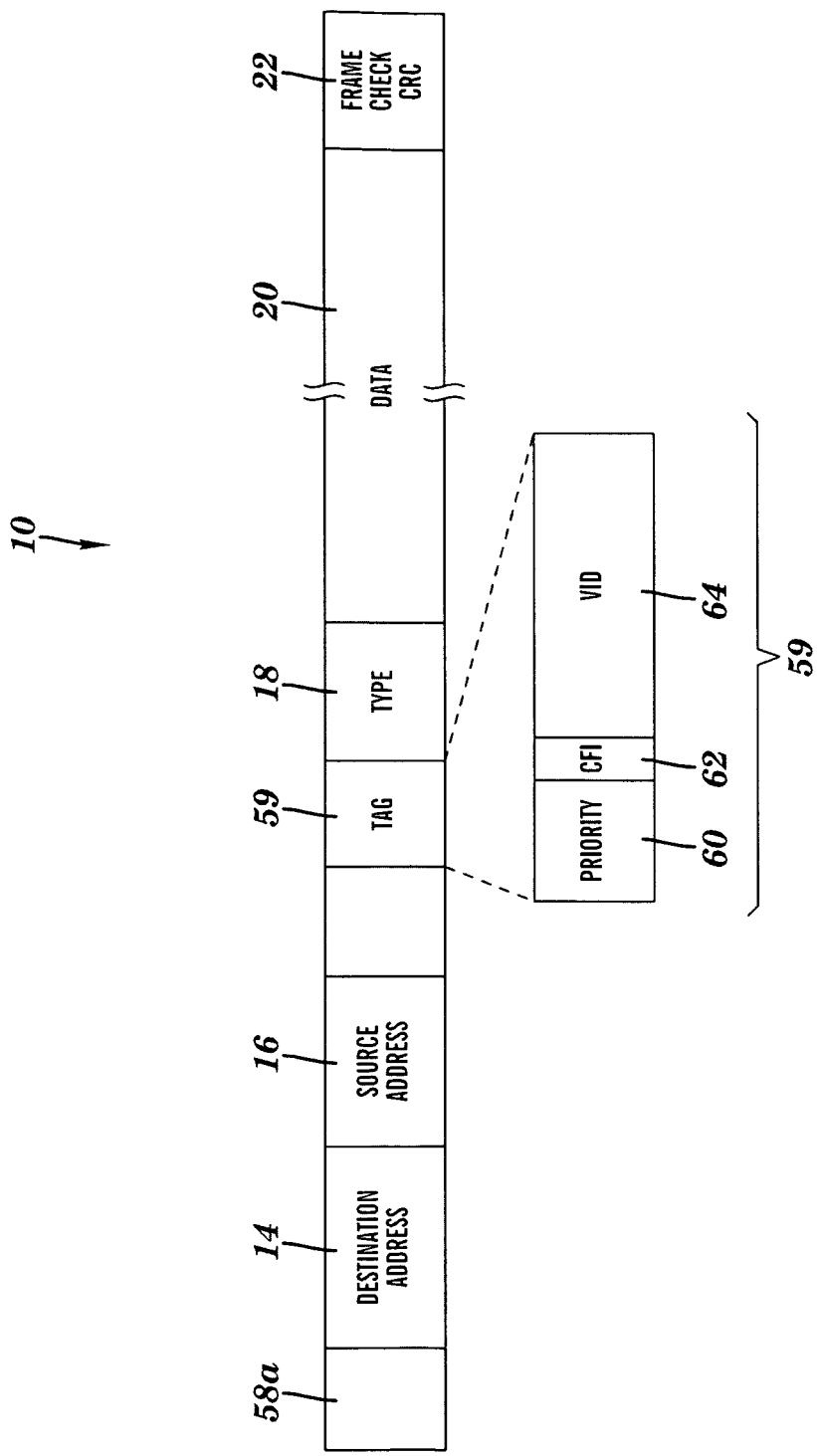
FIG. 8 is a block diagram of a conventional 802.1Q frame.

Referring to FIG. 8 together with FIG. 2, under the IEEE 802.1Q trunking protocol four bytes are added (after the destination and source MAC address 14, 16) to a standard Ethernet frame 10 before transmission on a trunk. The first two bytes 58a (0x8100), identify the Ethernet frame 10 as being an 802.1Q frame. The two bytes known as the VLAN tag 59 are divided into three fields, namely a three-bit field 60 used to identify a priority level for the frame, a 1 bit field 62 (known as the Canonical Format Indicator [CFI]) which indicates inter alia whether bit order is canonical or non-canonical, and a 12-bit field 64 (known as the VID or VLAN identifier) which identifies the VLAN to which a particular frame belongs.

Figure 9:
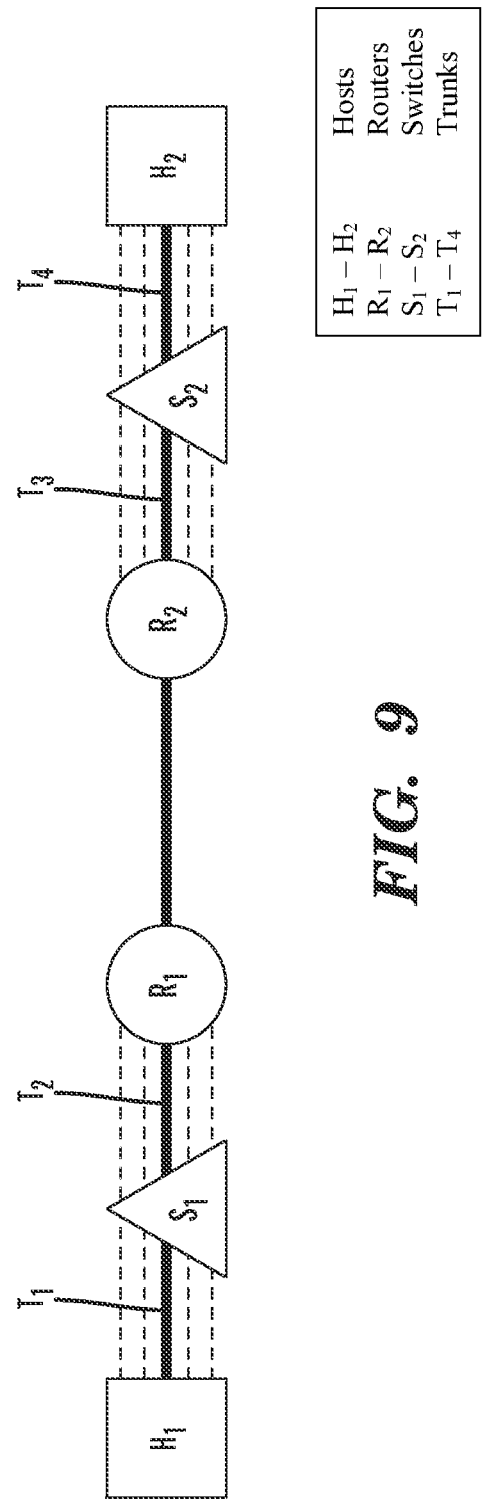
FIG. 9 is a block diagram of a trunk connection between two switches and routers in a short range VPN.

Referring to FIG. 9, the 802.1Q trunking protocol enables local communication between several hosts $H_1$, $H_2$ by providing a first trunk $T_1$ between host $H_1$ and switch $S_1$, a second trunk $T_2$ between switch $S_1$ and router $R_1$, a third trunk $T_3$ between router $R_2$ and switch $S_2$ and a fourth trunk $T_4$ between switch $S_2$ and host $H_2$. Since the 802.1Q tag is 4 bytes long, the maximum and minimum sizes of the resulting tagged Ethernet frames are 1522 bytes and 68 bytes respectively.

D.2. Long-Range VPNs Using Virtual Private Line Services (VPLS)

Virtual Private Line Services (VPLS) is a protocol which enables an Ethernet Frame to be communicated between hosts that are geographically located far apart (e.g. $host_1$ in Glasgow, $host_2$ in Paris).

The end points of a long-range VPN are called Label Edge Routers (LER). The LERs through which an Ethernet Frame enters and exits a long-range VPN are respectively known as ingress and egress LERs. Label Switch Routers (LSR) are high-speed routers in the core of a long-range VPN, that perform routing based only on label switching.

VPLS works by encapsulating Ethernet frames with a VPLS packet comprising an MPLS header, wherein an MPLS header contains one or more 4-8 byte labels (collectively known as a label stack). The VPLS packet carries the labels during its entire journey through the core of a long-range VPN. When an ingress LER receives an unlabelled Ethernet Frame, the ingress LER determines a forwarding equivalence class for the Ethernet Frame, and inserts a label stack in the packet's newly created VPLS header. The tagged packet (i.e., the VLPS packet comprising the MPLS header and label stack therein) is then passed on to the next hop router for the tunnel. When a VPLS packet is received by an LSR, the topmost label is examined, and depending on its contents, the LSR performs a variety of operations on the label stack. During these operations, the payloads of the VPLS packet (and the format of the frame encapsulated therein) is not examined. The forwarding of the packet is based purely on its labels (i.e. protocol independent packet forwarding). At the egress LSR, the last label is removed from the label stack so that only the payload (i.e. the Ethernet Frame) remains.

LDP (Label Distribution Protocol) is a protocol used by routers in VPLS environments to inform other routers of the label assignment they have made. LDP allows routers to agree with one another on the meaning of labels so that a host knows which label to use in order to forward traffic to another host. Using the above example, prior to the communication between hosts $H_1$ and $H_2$, the routers $R_1$ and $R_2$ establish an LDP session therebetween, in which the routers $R_1$ and $R_2$ exchange labels for specific VPLS virtual circuits. These labels are then used to ensure that a message from host $H_1$ is sent via switch $S_1$, through routers $R_1$ and $R_2$ to eventually reach host $H_2$ (through switch $S_2$).

E. Connecting Short-Range and Long-Range VPNs

The 802.1Q VLAN standard effectively enables the creation and management of short-range VPNs, whereas VPLS enables the creation and management of long-range VPNs. However, in order to simultaneously establish short-range and long-range VPNs between two hosts, it is necessary to separately define and provision both classes of VPN and ensure that the two VPNs are compatible and synchronized.

Figure 10:
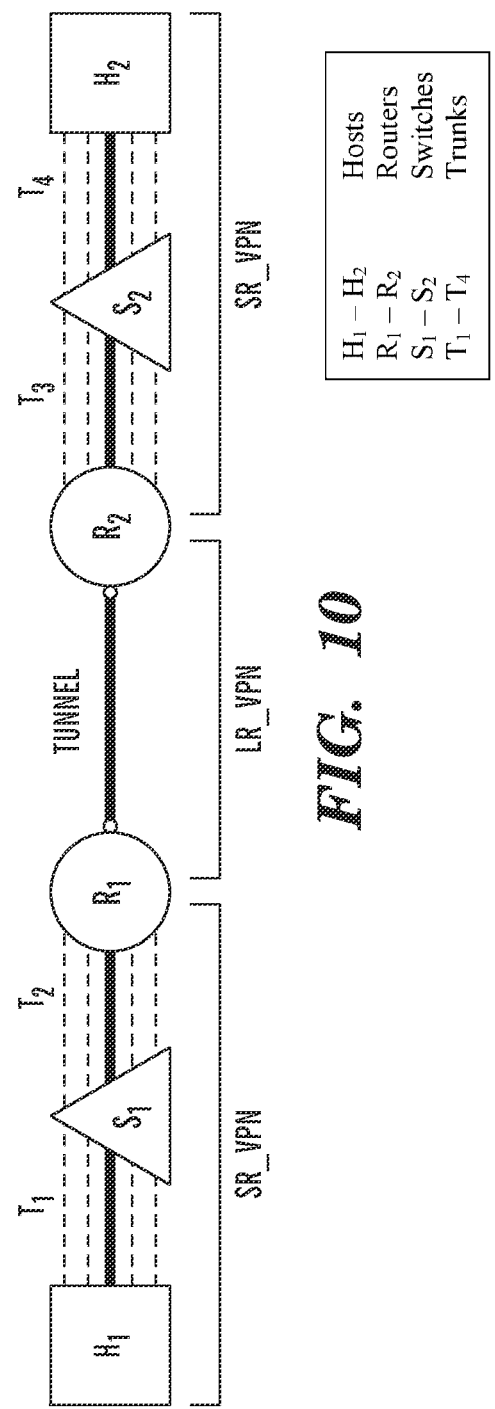
FIG. 10 is a block diagram of a conventional connection between a short range VPN and a long range VPN.

For example, referring to FIG. 10, let a host $H_1$ and a host $H_2$ be part of a same short-range VPN (SR-VPN). However, let $H_1$ and $H_2$ be remotely located from each other. Let host $H_1$ be connected to a VLAN-aware switch $S_1$ and a router $R_1$ by trunks $T_1, T_2$. Similarly, let a host $H_2$ be connected to a VLAN-aware switch $S_2$ and a router $R_2$ by trunks $T_4, T_3$. Let the two routers $R_1$ and $R_2$ be connected by a tunnel through long-range VPN (LR-VPN).

For a message to be transmitted from host $H_1$ to host $H_2$ the message is first encapsulated in an Ethernet frame and provided with an 802.1Q label so that the Ethernet frame can be transported from host $H_1$ to router $R_1$ through the switch $S_1$ and trunks $T_1, T_2$ of the short-range VPN (SR_VPN). On reaching router $R_1$, the 802.1Q label is removed from the Ethernet frame and the Ethernet frame is encapsulated in a VPLS packet with a VPLS label stack. The resulting VPLS packet is then transmitted from router $R_1$ to router $R_2$ through tunnel X. On reaching $R_2$, the Ethernet frame is extracted from the payload of the VPLS packet and provided with an 802.1Q label so that the Ethernet frame can be transported on the short-range VPN (SR_VPN) to host $H_2$.

Thus, two conversion steps are needed to transport an Ethernet frame from host $H_1$ to host $H_2$. The first conversion step is the removal of an 802.1Q label from an Ethernet frame and the encapsulation of the frame in a VPLS packet. The second conversion step is the extraction of the Ethernet frame from a VPLS packet and the addition of an 802.1 Q label thereto. But these two conversion steps are unwieldy and time-consuming; and may be difficult to synchronise, particularly with changes in the hardware configuration of the short-range VPN.

F. IP Frame Format

Figure 11:
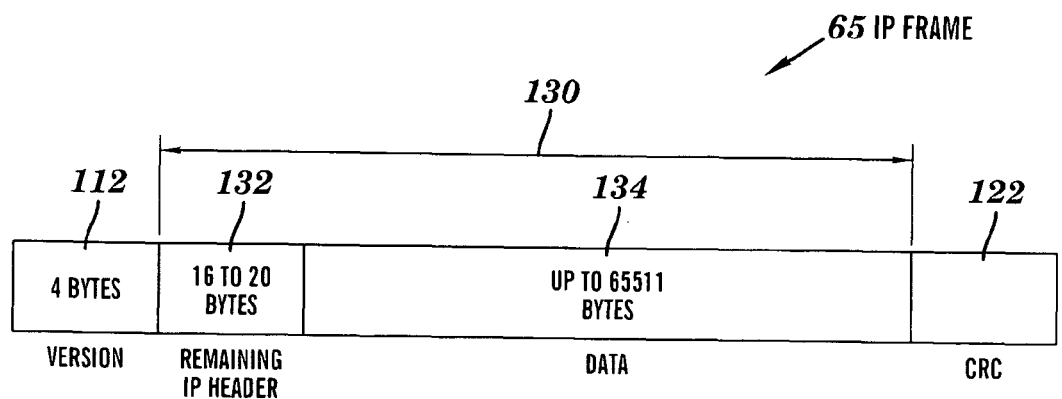
FIG. 11 is a block diagram of an IP frame according to the first embodiment

Referring to FIG. 11, an IP frame 65 comprises a four byte preamble field 112 (which is used to identify the start of the frame), in accordance with embodiments of the present invention. The IP frame 65 further comprises an IP packet 130 with its associated IP header 132 (and IP source and destination addresses (not shown)) and IP text section 134. Following the IP packet 130, the IP frame 65 comprises a CRC checksum field 122.

However, the IP frame 65 does not include the MAC source and destination addresses of a traditional Ethernet frame (as shown in FIG. 2). Nor, does the IP frame 65 include the frame type identifier field of a traditional Ethernet frame. These omissions reduce the size of an IP frame 65 by fourteen bits, but more importantly ensure that the frame's payload is no longer subject to the 1500 byte limit normally provided under the Ethernet protocol. Thus, an IP packet can be encapsulated in its entirety within the IP frame 65 and transmitted without fragmentation and re-assembly.

Figure 12:
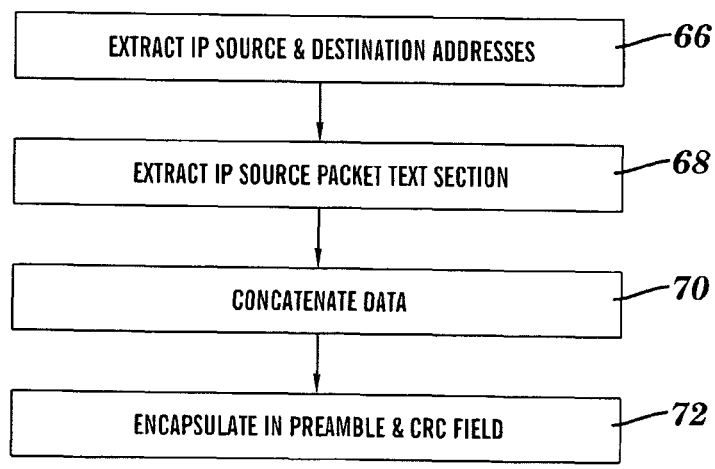
FIG. 12 is a flowchart of the processing of an IP packet to produce the IP frame shown in FIG. 11, in accordance with embodiments of the present invention.

Referring to FIG. 12, an IP frame is formed from an IP packet by the following steps:—

(a) extracting (step 66) the IP source and IP destination addresses from the IP packet;

(b) extracting (step 68) the text section from the IP packet;

(c) concatenating (step 70) the IP source and destination addresses and the text section to produce concatenated IP data; and (d) encapsulating (step 72) the concatenated IP data between the preamble field and the CRC checksum field.

G. IP Switch

Since the IP frame does not comprise a MAC source and destination address, it can no longer be processed by a conventional LAN switch (in accordance with the data link layer). Instead, the IP frame is transported to its correct recipient by a routing device, namely an IP switch 74. In effect, the IP switch 74 (see FIG. 13) forwards IP packets based on their IP destination address, so that the MAC address table of a prior art LAN switch is no longer needed. Since a MAC source address, a MAC destination address, and a frame type identifier does not exist in the IP frame 65, the IP switch 74 is not configured to process a MAC source address, a MAC destination address, and a frame type identifier.

Figure 1:
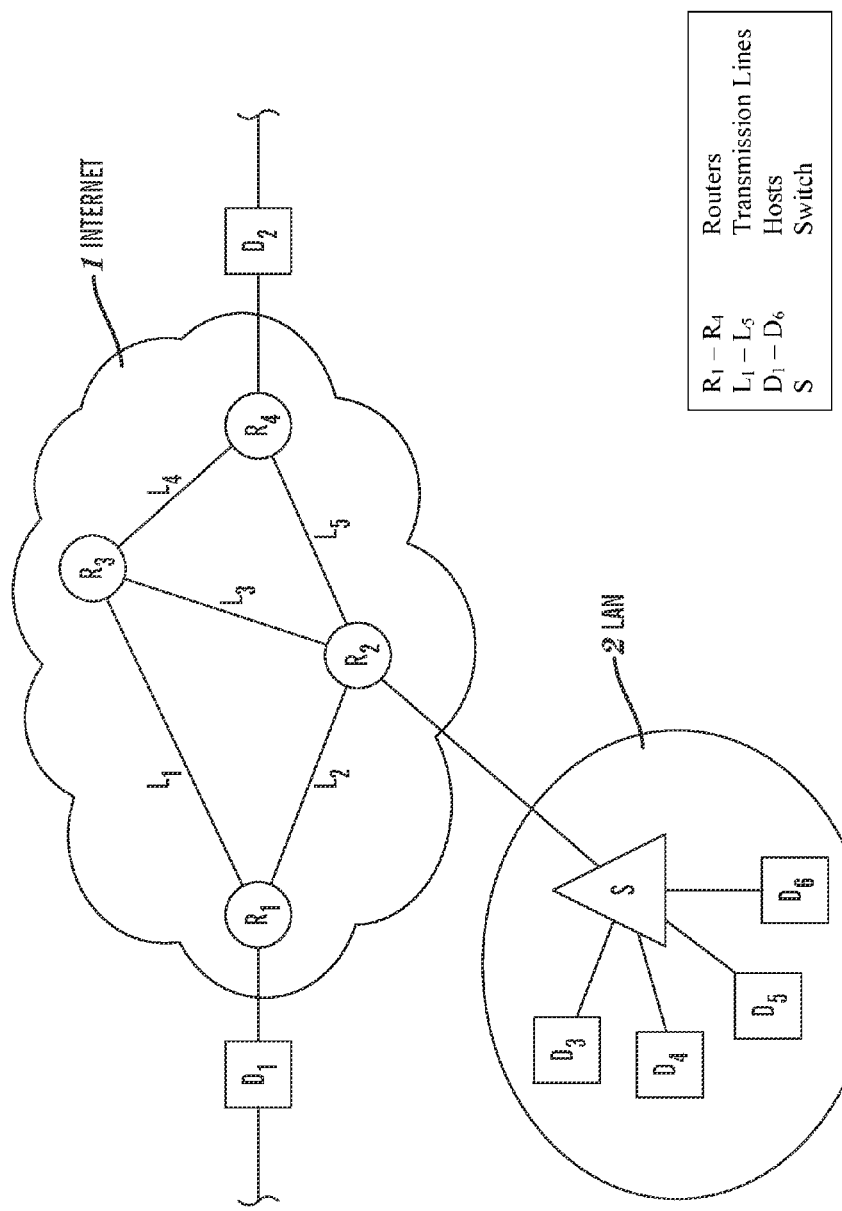
FIG. 1 is a block diagram of an example of computers connected to the Internet.
Figure 13:
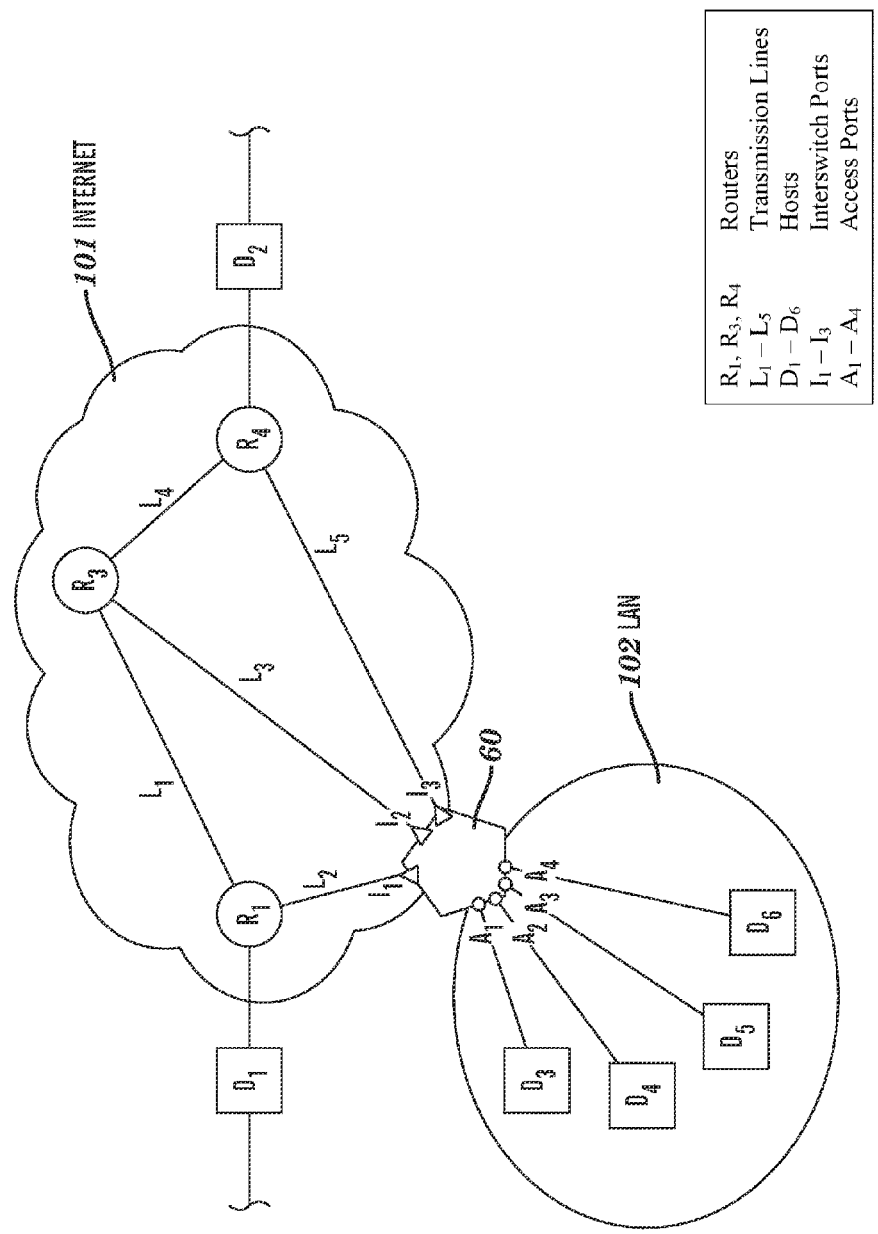
FIG. 13 is a block diagram of computers connected to the Internet through the IP switch of the second embodiment, in accordance with embodiments of the present invention.

Comparing FIG. 1 with FIG. 13, it can be seen that the LAN switch S of FIG. 1 is removed from a LAN 102 and replaced with an IP switch 74 to which the hosts $D_3$-$D_6$ are directly connected. Similarly, the IP switch 74 is connected to other conventional routers or other IP switches. Thus, the IP switch 74 becomes a default gateway for the LAN 102. The IP switch's ports are divided into interswitch (or transport ports) ($I_1$-$I_3$) and IP access ports ($A_1$-$A_4$). Interswitch ports ($I_1$-$I_3$) are statically configured to connect IP switches together wherein these connections cannot be overwritten by a dynamic learning procedure. In contrast, routes through IP access ports ($A_1$-$A_4$) are dynamically learned and can be overwritten depending on changing conditions in the network. In FIG. 13, the Internet 101 comprises routers $R_1$, $R_3$, and $R_4$, which are connected to each other, to Interswitch ports $I_1$, $I_3$, and $I_4$, respectively, and to the IP switch 74 by transmission lines $L_1$, $L_2$, $L_3$, $L_4$, and $L_5$ in the manner shown. In addition, routers $R_1$ and $R_4$, are connected to hosts $D_1$ and $D_2$, respectively.

By removing the layer 2 link between the hosts $D_3$-$D_6$ and the router $R_2$; and replacing it with a single link between each host and the IP switch 74, the separate ARP and MAC tables of the prior art LAN switch and IP router are replaced by a single IP switching table in the IP switch 74, thereby avoiding the prior art problem of synchronizing ARP and MAC tables.

Figure 14:
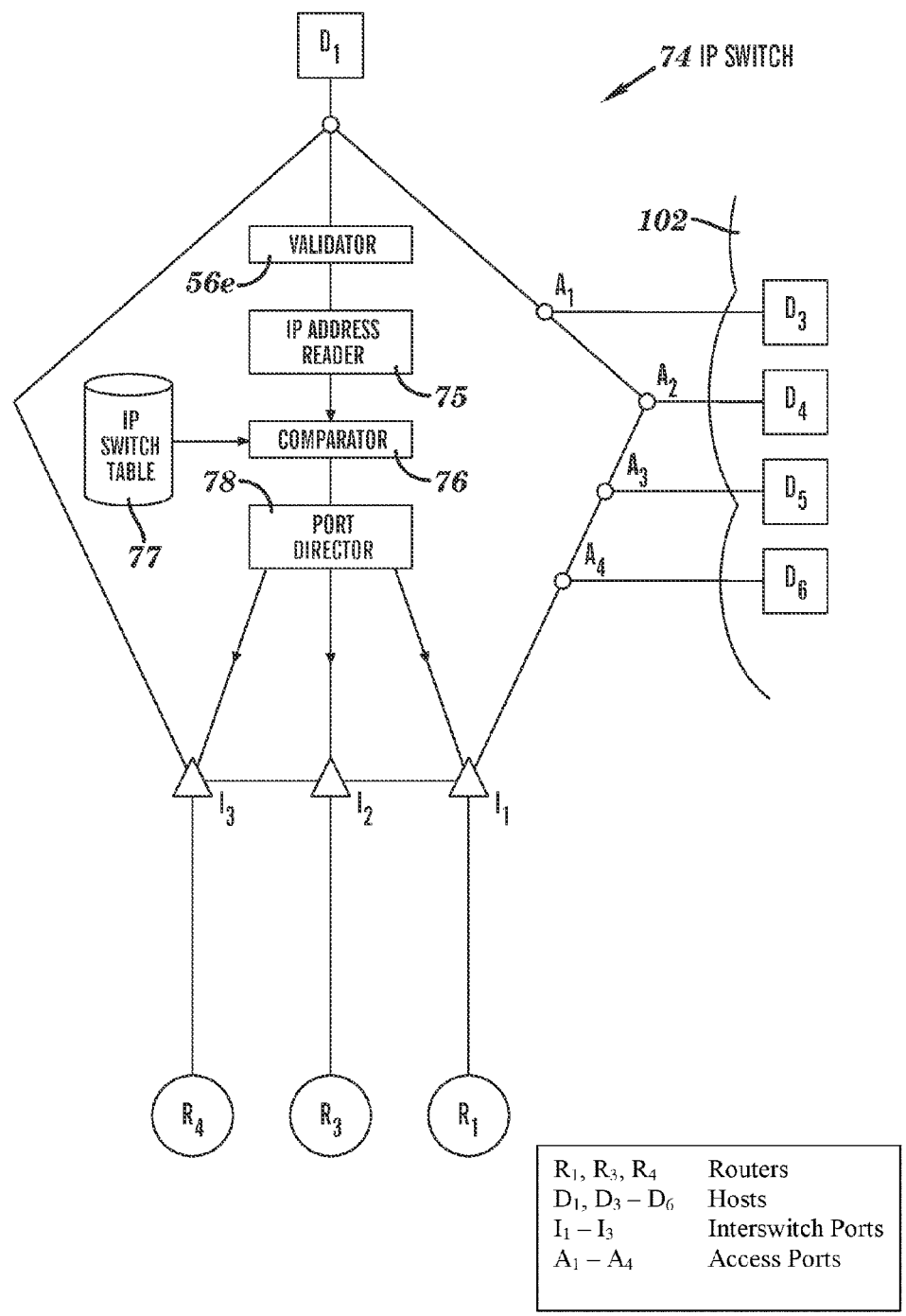
FIG. 14 is a more detailed block diagram of the IP switch shown in FIG. 13, in accordance with embodiments of the present invention.

Referring to FIG. 14, the IP switch 74 comprises a validator 56e for validating an incoming IP frame, an IP address reader 75 which reads the IP destination address of the incoming IP frame, and a comparator 76 which compares the IP destination address with the IP addresses in an archive, namely the IP switching table 77. The IP switch 74 further comprises a port director 78 which directs an IP frame to a port (i.e., to an interswitch port or to an access port) whose port number corresponds with the matching entry in the IP switching table 77.

H. Dynamic Learning Procedures in the IP Switch

The IP switching table in the IP switch 74 is populated with host IP addresses for each interface thereto, by means of:

(a) DHCP snooping (using DHCP Option 43 and well known Multicast IP@) by intercepting and interpreting DHCP server replies sent back to a host after the host has requested its IP address with a DHCP request; and (b) a dynamic IP Learning procedure performed only on the IP switch's access port(s).

In broad overview, when an IP switch 74 dynamically discovers (via DHCP snooping or IP source address checking) that a new IP device is directly connected thereto, it adds an IP route entry to its IP switching table and advertises (using IP routing protocols such as OSPF) the new entry to its IP peers. The new entry has a lifetime and can be suppressed immediately when a link goes down or when a DHCP response is intercepted by the IP switch 74. Regardless of whether it is learned by the dynamic learning procedure or the DHCP snooping procedure, an entry in the IP switching table will have an administrative distance of 0 (to represent a directly connected physical link). A more detailed discussion of the dynamic IP learning procedure and the DHCP snooping procedure follows below.

H.1 Dynamic IP Learning Procedure

Figure 15:
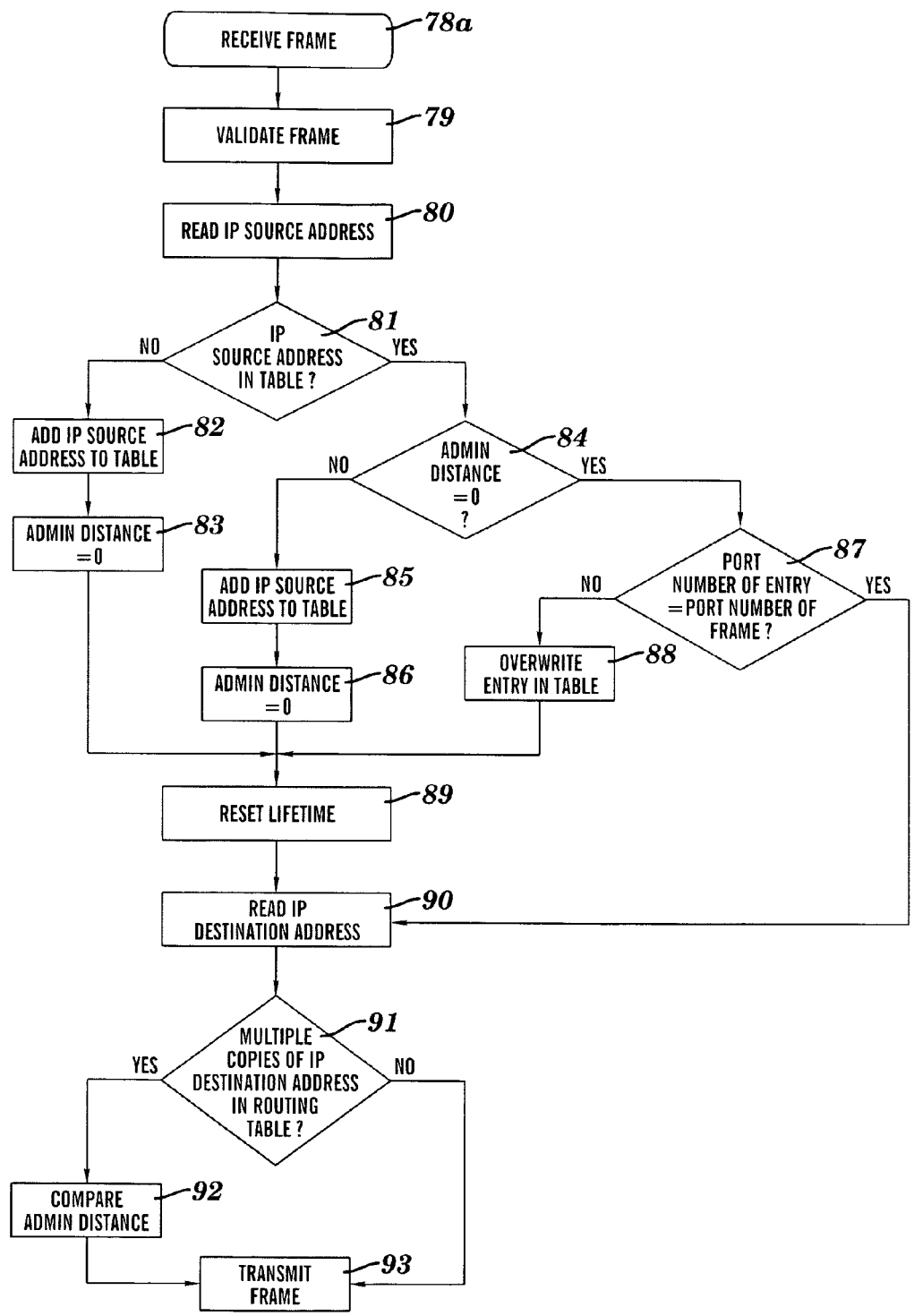
FIG. 15 is a flowchart of the dynamic learning procedure employed in an access port of the IP switch shown in FIG. 13, in accordance with embodiments of the present invention.

Referring to FIG. 15, on receipt (step 78a) from a host of an incoming IP frame on an access port, the IP switch validates (step 79) the CRC of the IP frame. Following validation, the IP switch reads (step 80) the IP source address from the IP frame. The IP switch then checks (step 81) whether the IP source address is present in its IP switching table.

If the IP source address of the IP frame is not present in the IP switching table, the IP source address (with subnet mask/32 to provide a route to a single host) is added (step 82) to the IP switching table, together with the number of the port on which the IP frame was received. The /32 subnet mask is included with the IP source address to ensure that the IP address only relates to the specifically identified host and not any other hosts. In particular, the couple (IP address, /32 subnet mask) is an IP subnet containing a single IP address. The administrative distance of the new entry is then set (step 83) to zero (or to a pre-defined administrative distance threshold such as zero).

However, if the IP source address of the IP frame is present in the IP switching table, the administration distance of the entry in the IP switching table is checked (step 84). If the administration distance of the entry is not equal to zero (i.e. the entry does not represent a directly connected route) or above a pre-defined administrative distance threshold (e.g., zero), then the IP source address of the IP frame is added (step 85) to the IP switching table (to maintain redundancy in the table) together with the subnet mask /32 and the number of the port on which the IP frame was received. The administration distance of the new entry is set (step 86) to zero (or to a pre-defined administrative distance threshold such as zero).

If the IP source address of the incoming IP frame has a matching counterpart in the IP switching table and the administration distance is equal to zero (i.e. is the result of a static configuration) the port number of the entry is compared (step 87) with that of the port on which the IP frame was received.

If the port number of the entry in the switching table matches that of the port on which the IP frame was received, then step 90 is next executed.

If the port number of the entry in the switching table does not match that of the port on which the IP frame was received, it means that the source device was moved to another port. Thus, the entry in the IP switching table is overwritten (step 88) with the details of the incoming IP frame and port on which it was received.

The lifetime of the relevant entry in the IP switch is then reset (step 89). Thus, the entries in the IP switching table comprise the following variables: IP subnet (subnet address, subnet mask), [administrative distance/other routing protocol internal metric indicative of confidence in the entry], next hop (when possible), next interface. The administrative distance is indicative of a confidence in the entry's routing protocol for routing an IP frame from the port identified by the port identifier to the IP address of each entry. The confidence for the entry increases with decreasing administrative distance. An administrative distance of zero ("0") is a smallest possible administrative distance and denotes a directly connected physical link. For example, the IP switching table could include the following entries:

172.17.0.0/16 is variably subnetted, 2 subnets, 2 masks

O IA 172.17.0.0/16[110/11] via 9.100.112.132, 16:53:03, FastEthernet0/0

O IA 172.16.0.0/16[110/2] via 9.100.112.134, 16:53:03, FastEthernet0/0

172.19.0.0/32 is subnetted, 2 subnets

O E2 172.19.147.138 [110/20] via 9.100.112.130, 16:53:03, FastEthernet0/0

O E2 172.19.147.134 [110/20] via 9.100.112.130, 16:53:03, FastEthernet0/0

In use, the IP destination address is then read (step 90) from the IP frame and compared (step 91) with those in the IP switching table. If multiple copies of the IP destination address are found in the IP switching table, the administration distances of the entries are compared (step 92) and the entry with the lowest administration distance is used to determine the number of the port from which to transmit the IP frame. The IP frame is then transmitted (step 93) from the relevant port of the modified IP switch. Similarly, if there is only one copy of the IP destination address in the IP switching table, the IP frame is transmitted (step 93) from the port corresponding thereto.

H.2. DHCP OPTION 43 Dynamic Learning Procedure

DHCP option 43 is a field in which an end-host can put an identifier in a DHCP request. At present a DHCP server checks the source MAC address of a DHCP request. However, with the IP switch, MAC addresses are not used any longer. Thus, it is necessary to use another identifier to enable a DHCP server to determine if a host is authorized to acquire an IP address therefrom (by means of a HTTP request). In particular, DHCP option 43 is used with a host identifier instead of a traditional source MAC address to identify the originator of a DHCP request and determine whether or not the originator is entitled to acquire an IP address therefrom. For example, the host name could be used as a host identifier.

Option 43 Parameter hostname:

PC0012.officesite.country.companyname.com

As a result, the DHCP server will link the IP address it assigned with the hostname it received in the DHCP request.

In general, the main purposes of using option 43 in the DHCP request is to authenticate, validate, and account the DHCP client as described above; and to provide an IP address from an appropriate pool, range, or IP subnet. For example, if an option 43 DHCP request comprising the identifier hostname=pc.engineeringstaff.lab.ibm.com is received by a DHCP server, on detecting the option 43 value, the DHCP server could decide to offer an IP address in the subnet 12.12.12.0/24 because it has determined that this host relates to a member of the engineering staff.

Figure 16:
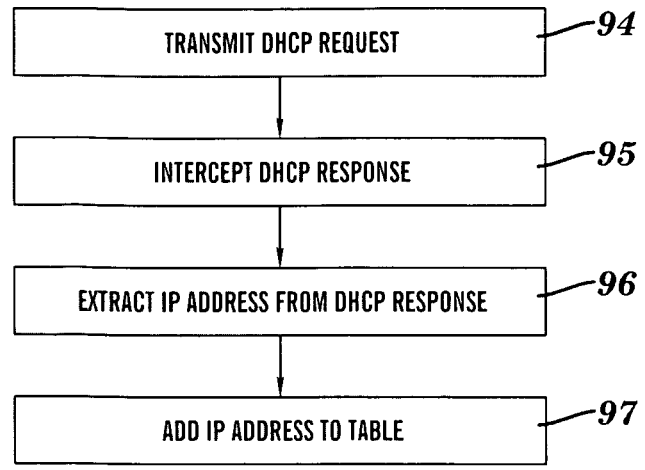
FIG. 16 is a flowchart of the DHCP option 43 snooping procedure employed in an access port of the IP switch shown in FIG. 13, in accordance with embodiments of the present invention.

Referring to FIG. 16, in broad overview, the method of populating the IP switching table of the IP switch using the DHCP option 43 dynamic learning procedure comprises the steps of:

transmitting (step 94) a DHCP option 43 request to a DHCP server;

intercepting (step 95) the DHCP response from the DHCP server;

extracting (step 96) the IP address from the DHCP response; and adding (step 97) the IP address to the IP switching table.

I. Transmission from Interswitch Ports in the IP Switch

Figure 17:
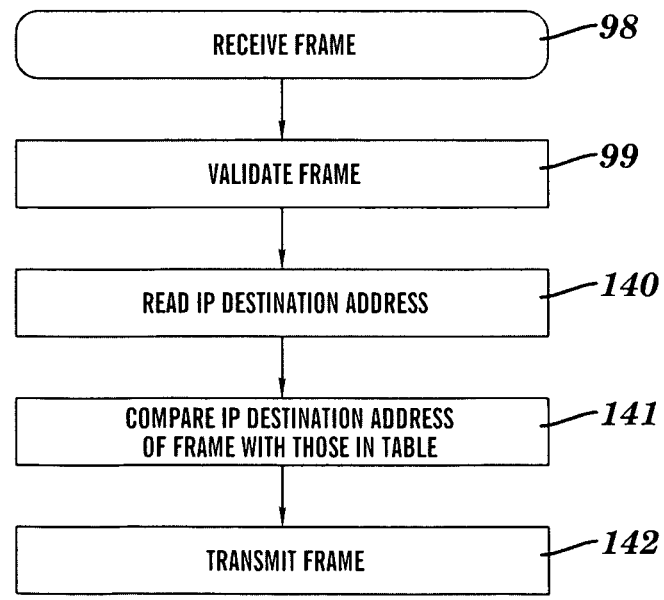
FIG. 17 is a flowchart of the operation of a transport port in the IP switch shown in FIG. 13, in accordance with embodiments of the present invention.

Interswitch ports are statically configured and do not undergo the above-described dynamic learning process. Thus, referring to FIG. 17, on receipt (step 98) from a router of an incoming IP frame on an interswitch port, the frame is validated (step 99) by means of its CRC. The IP destination address is then read (step 140) from the IP frame and compared (step 141) with the IP destination addresses (and associated subnet masks) in the IP switching table, to find the closest matching entry. The IP frame is then transmitted (step 142) from the port (i.e., from an access port or from an interswitch port) whose number is listed in the closest matching entry.

In summary, in contrast with the operations of a traditional LAN switch, the IP switch does not check for a protocol type of an incoming IP frame, nor does it check for the MAC addresses in the frame.

J. Universal VPN Based on an IP Frame

Figure 18:
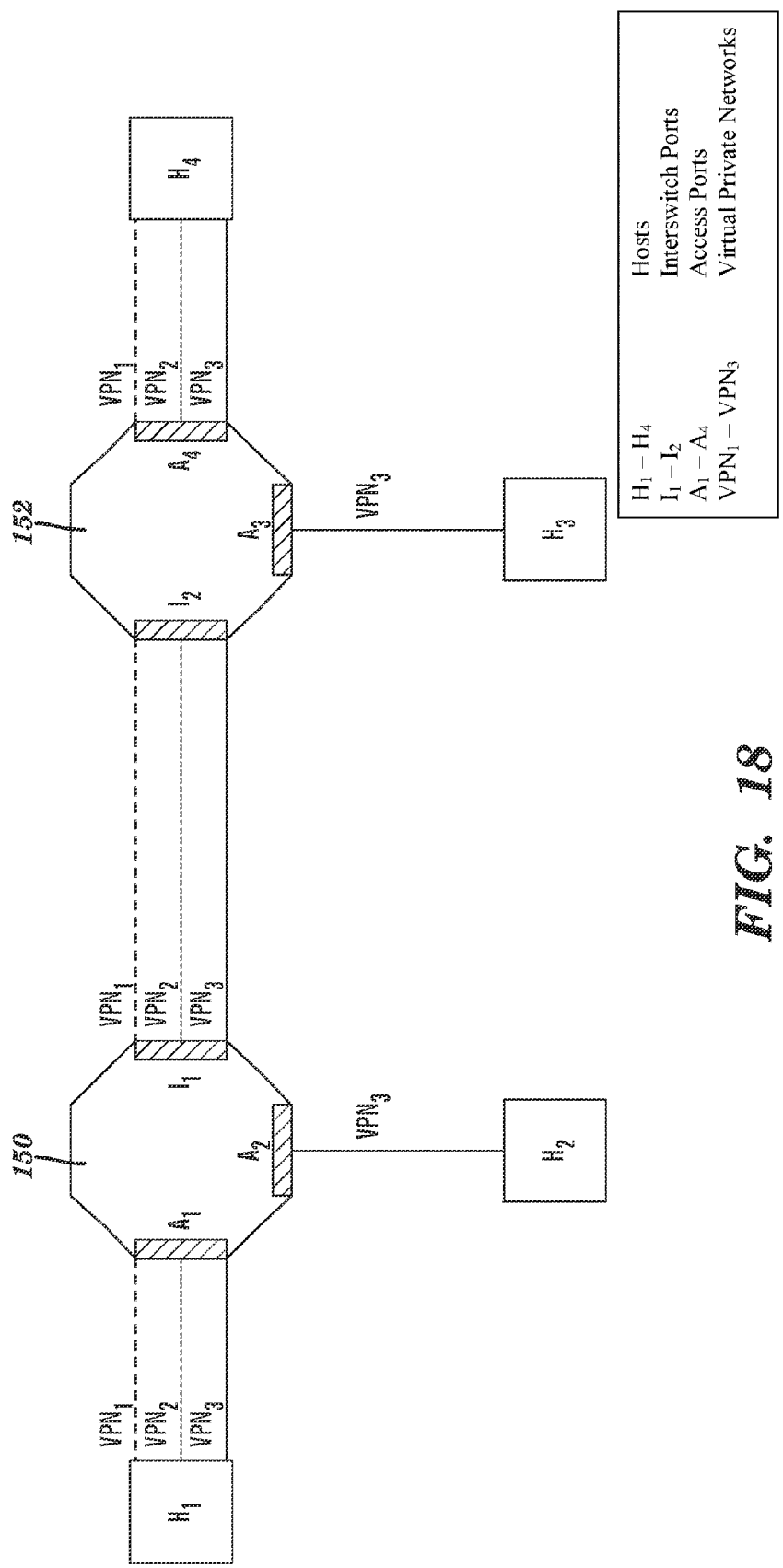
FIG. 18 is a block diagram of a universal VPN employing IP switches as shown in FIG. 13, in accordance with embodiments of the present invention.

Using MPLS/VPN tagging with an IP frame enables the creation and operation of a universal VPN that embraces traditional short-range and long-range VPNs in a single VPN. Referring to FIG. 18, let hosts $H_1$, $H_2$, $H_3$ and $H_4$ be members of a same universal VPN (i.e. $VPN_3$). Let hosts $H_1$ and $H_4$ also be members of universal VPNs $VPN_1$ and $VPN_2$. Comparing FIGS. 10 and 18, it will be noted that the switches $S_1$ and $S_2$ and routers $R_1$ and $R_2$ (of traditionally connected short-range and long-range VPNs) are replaced with IP switches 150, 152. In particular, hosts $H_1$ and $H_2$ are directly connected to IP switch 150 through access ports $A_1$ and $A_2$; and hosts $H_3$ and $H_4$ are directly connected to IP switch 152 through access ports $A_3$ and $A_4$. Let the two IP switches 150, 152 be connected to each other through interswitch ports $I_1$ and $I_2$. Thus, universal VPN $VPN_3$ comprises closely located host pairs (($H_1$, $H_2$) and ($H_3$, $H_4$)) and distantly separated host pairs (($H_1$, $H_3$), ($H_1$, $H_4$), ($H_2$, $H_3$) and ($H_2$, $H_4$)); wherein the hosts in the closely located host pairs are directly connected to the same IP switch and the hosts in the distantly separated host pairs can contact each other through the two IP switches 150, 152. It should be noted that messages are transmitted on a universal VPN in the form of IP frames.

In a universal VPN, the 802.1Q trunking protocol is no longer needed to establish a communications link between a host and a router, because the traditional distinction between short-range and long-range VPNs no longer exists in the universal VPN. Instead, the 802.1Q link is replaced with a VPLS link between a host and an IP switch. Further, VPLS is employed to transmit an IP frame from one IP switch to another. Thus, a same, single labelling and encapsulation system is employed for all message transmissions, at all stages of a universal VPN between all types of host pairs therein.

Figure 19:
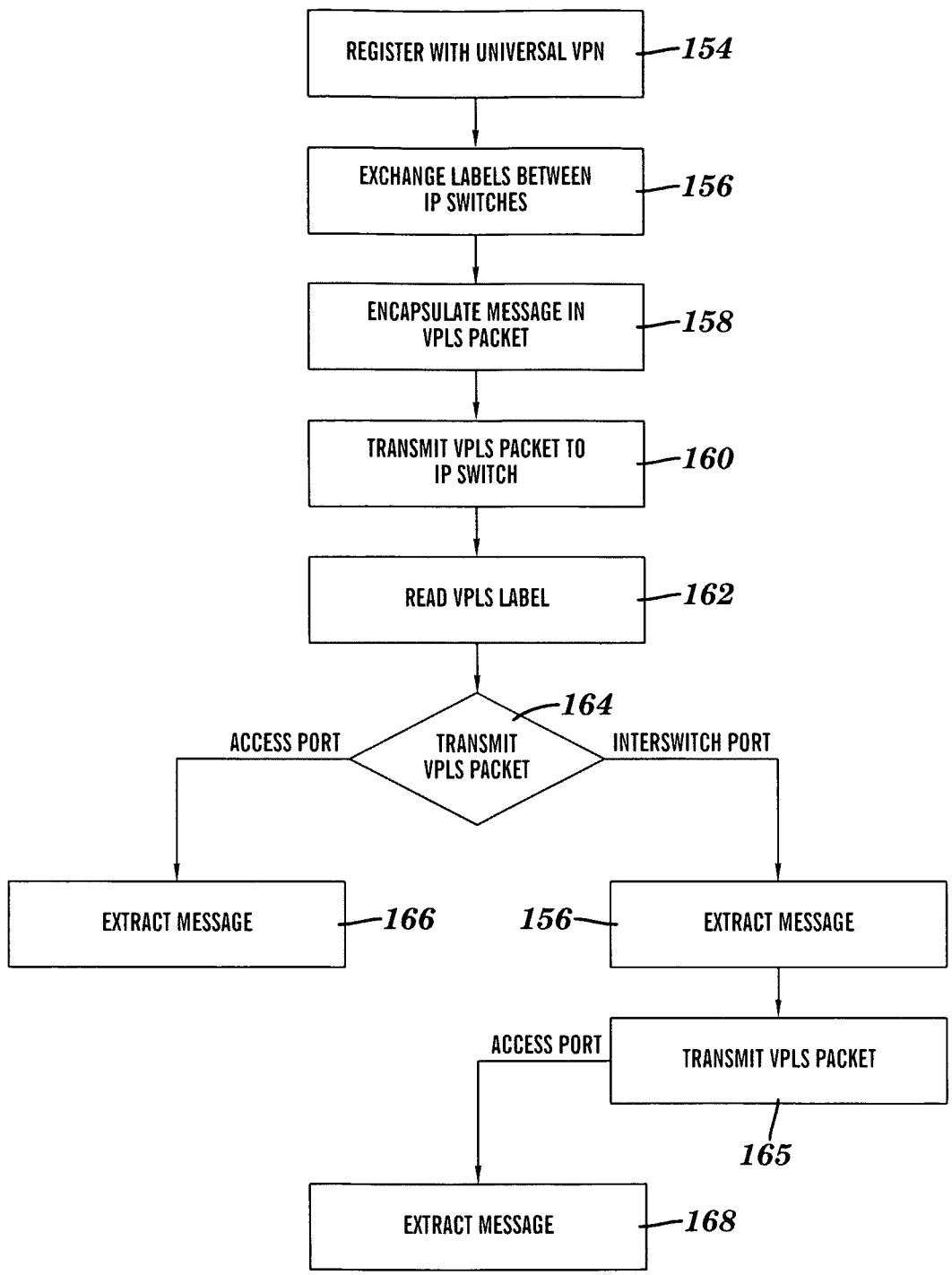
FIG. 19 is a flowchart of the transmission of an IP frame as shown in FIG. 11 in the universal VPN shown in FIG. 18.

Referring to FIG. 19 together with FIG. 18, in a first step, hosts register (step 154) with a given universal VPN by establishing an LDP session with the IP switch to which they are directly connected. For example, hosts $H_1$ and $H_2$ register with $VPN_3$ by establishing an LDP session with the IP switch 150. Similarly, hosts $H_3$ and $H_4$ register with $VPN_3$ by establishing an LDP session with the IP switch 152. These LDP sessions are similar to traditional LDP sessions between VPLS peers. The IP switches (150,152) then establish an LDP session and exchange (step 156) VPLS labels therebetween. During these LDP sessions, members of a same universal VPN exchange labels which identify the universal VPN and enable its distinction from other universal VPNs of which individual hosts or IP switches might be a member. For example, hosts $H_1$-$H_4$ and IP switches 150, 152 exchange labels that uniquely specify universal VPN $VPN_3$. Similarly, hosts $H_1$ and $H_4$ and IP switches 150, 152 exchange labels that uniquely specify universal VPN $VPN_1$.

The label exchange process is repeated for each universal VPN of which the IP switches and hosts are members, and effectively ensures that messages intended for hosts on a given universal VPN are not transmitted to other hosts that are not members of the universal VPN. Take for example, the label exchange process between host $H_2$ and IP switch 150 in respect of universal VPN $VPN_3$. The label exchange process configures the IP switch 150 to: receive IP frames from host $H_2$ comprising a VPLS label for universal VPN $VPN_3$; and forward IP frames (from other directly connected hosts (e.g. $H_1$) or IP switches (e.g. IP switch 152)) with labels for universal VPN $VPN_3$ to host $H_2$.

There are many different possible forms for the label exchange process. However, in one form, all members of the same VPN (locally or remotely located), assign the same VPN label to the VPLS packets destined for a member of the same particular VPN.

Once the label exchange process is complete, let host $H_1$ attempt to send a message to other members of universal VPN $VPN_3$. The host sending the message (i.e., $H_1$) is designated as a "source host" and the hosts intended to receive the message (i.e., other members of universal VPN $VPN_3$) are designated as "destination hosts". The IP frame from host $H_1$ is encapsulated (step 158) in a VPLS packet comprising the appropriate VPLS label. The VPLS packet is then transmitted (step 160) to the IP switch (150) to which the host ($H_1$) is directly connected.

On receipt of the VPLS packet (at access port $A_1$), the IP switch (150) reads (step 162) the packet's VPLS label and checks the entries in its switching table with the appropriate VPN label, to determine the IP routing entries therefor. The IP switch then forwards (step 164) the VPLS packet to its appropriate access or interswitch ports. This is, in effect, the same process as the previously-described process for transmitting IP frames through an IP switch (i.e. without a VPN). However, in this case (i.e., with a VPN) the IP switch will only look at IP route entries in its switching table that correspond to the specific VPN (of the VPN label of the improved IP frame received from the VPLS core).

More specifically, in the case of a transmission from an access port to other IP switches (152) connected thereto through an interswitch port (e.g. $I_1$), the process of routing the VPLS packet through the IP switch 150 comprises the steps of:

receiving a VPLS packet containing one VPN label from an access port; and transmitting the VPLS packet to an egress PE IP switch (152) by adding a VPLS label on top of the label stack. The VPLS label has local provider IP significance. In particular, the VPLS label is swapped by each provider IP switch (or label switch IP switch) until the VPLS frame reaches the egress PE IP switch.

In the case of a transmission from an interswitch port of IP switch 152 to an access port, the process of routing the VPLS packet through the IP switch 152 comprises the steps of:

receiving a VPLS packet from an interswitch port, wherein the VPLS packet contains two labels (the VPLS label and the VPN label) or one label (the VPN label) in case of penultimate provider IP switch label popping);

reading (step 156) the VPN label to determine the VPN membership of the received IP frame;

comparing the entries in its switching table with the appropriate VPN label, to determine the IP routing entries therefor;

removing the VPN label; and transmitting (step 165) the IP frame to the appropriate access port (e.g. ($A_3$, $A_4$)) and hosts (e.g. ($H_3$, $H_4$)) directly connected thereto, after which each host ($H_3$, $H_4$) extracts (step 168) the message from the VPLS packet.

In the case of a transmission within IP switch 150 of the VPLS packet from an access port to another access port in step 164, the VPLS packet is transmitted from the another access port of switch 150 to the host connected thereto (e.g., $H_2$), after which the host ($H_2$) extracts (step 166) the message from the VPLS packet.

Thus, the IP switches 150, 152 act in an analogous fashion to provider edge routers in a conventional long-range VPN using the VPLS protocol, insofar as they exchange VPLS labels and VPLS packets between ingress and egress IP switches on either side of a universal VPN core.

As discussed supra, an administrator can configure both interswitch interfaces of an IP switch with IP addresses within the same IP subnet. This creates a directly connected route for specific IP subnet whose next interface is an interswitch port of the IP switch. In contrast, the switching table entries associated with the access ports of IP switches are populated using the dynamic learning procedures discussed supra. In the case of interswitch ports, LDP sessions are conducted as part of a normal discovery process in which IP switches at the edge of a VPN (universal or conventional long-range) core are identified.

In contrast, an access port does not initiate an LDP session, but is instead a recipient of an LDP session from a host directly connected thereto. Take, for example, host $H_2$ which is directly connected to access port $A_2$ of IP switch 150. In the absence of an LDP session between $H_2$ and $A_2$, $A_2$ defaults to the role of a simple access port $A_2$, as it is unaware of the existence of universal VPN $VPN_3$. However, an LDP session dynamically assigns a given universal VPN to an access port. In other words, an LDP session dynamically assigns universal VPN $VPN_3$ to access port $A_2$. Thus, an LDP session established between a host and an IP switch permits the host to exchange a VPN label with the IP switch. This permits the IP switch to flag all IP route entries (may be one but could be several) corresponding to the access port to which the hosts is directly attached, with the VPN flag. Then all route lookups needed to forward an IP frame received on a interswitch port to an access port will be processed using only IP route entries flagged with the VPN label. Thus, in conclusion, the universal VPN provides a single VPN architecture and configuration mechanism capable of linking hosts that are located close together or far apart in a seamless manner that is implemented in the same way for all of the devices on the VPN.

The present invention provides a computer program product comprising a storage medium having computer readable program code stored therein, said program code configured to be executed by a computer to cause the computer to perform the methods of the present invention.

The present invention provides a system comprising a computer configured execute program code stored in a storage medium to perform the methods described herein.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A universal Virtual Private Network (VPN) apparatus, comprising:

a first Internet Protocol (IP) switch, said first IP switch connected to a second IP switch, each IP switch independently comprising multiple ports comprising a plurality of access ports and an interswitch port, wherein each access port of each IP switch is identified by a port identifier and directly connected to a corresponding host;

wherein the interswitch port of the first IP switch is connected to the interswitch port of the second IP switch via a communication path in a public telecommunications medium;

wherein the first IP switch is configured to receive a first virtual private line services (VPLS) packet from a first source host at a first access port of the first IP switch to which the first source host is directly connected and to transmit the first VPLS packet to a first destination host directly connected to a second access port of the first IP switch via a first transmission path using a VPLS transmission protocol throughout the first transmission path, said first source host and said first destination host both being registered members of a first universal VPN, said first VPLS packet comprising a first IP frame comprising a first packet payload having a first message therein;

wherein the first IP switch is configured receive a second VPLS packet from a second source host at a third access port of the first IP switch to which the second source host is directly connected and to transmit the second VPLS packet to the second IP switch via a second transmission path using the VPLS transmission protocol throughout the second transmission path to enable the second IP switch to subsequently transmit the second VPLS packet to a second destination host connected to a fourth access port of the second IP switch via a third transmission path using the VPLS transmission protocol throughout the third transmission path, said second transmission path including the public communication path, said second source host and said second destination host both being registered members of a same universal VPN, said second VPLS packet comprising a second IP frame comprising a second packet payload having a second message therein;

wherein each IP switch further comprises a switching table comprising a plurality of entries, each entry comprising an IP address with an associated IP route, each entry further comprising an IP port identifier associated with the IP address and identifying a port of the multiple ports;

wherein the IP switch comprises means for dynamically populating and updating the switching table in a dynamic learning procedure for entries pertaining to incoming IP frames at the access ports; and wherein the switching table cannot be dynamically populated and updated in a dynamic learning process for entries pertaining to the interswitch port.

2. The universal VPN apparatus of claim 1, wherein the IP route in the entry of the switching table of the first IP switch corresponding to the first access port is flagged with a first VPN label identifying the first universal VPN;

wherein the IP route in the entry of the switching table of the first IP switch corresponding to the third access port is flagged with a second VPN label identifying the same universal VPN; and wherein the IP route, in the entry of the switching table of the first IP switch for an IP subnet whose next interface is the interswitch port of the second IP switch, is flagged with both the first VPN label and the second VPN label in conjunction with the second access port and the fourth access port, respectively.

3. The universal VPN apparatus of claim 2, wherein the first VPLS packet comprises the first VPN label in a header appended to the first IP frame, and wherein the second VPLS packet comprises the second VPN label in a header appended to the second IP frame.

4. The universal VPN apparatus of claim 1, wherein the same universal VPN is the first universal VPN.

5. The universal VPN apparatus of claim 4, wherein the same universal VPN is a second universal VPN differing from the first universal VPN.

6. The universal VPN apparatus of claim 5, wherein the second source host, the second destination host, or both the second source host and the second destination host is a registered member of the first universal VPN.

7. The universal VPN apparatus of claim 1, wherein the first IP switch does not comprise a Media Access Control (MAC) table that associates a MAC address of the first source host with the first source host's port identifier of the first access port.

8. The universal VPN apparatus of claim 1, wherein the first IP frame comprises an IP address of the first source host and does not comprise a Media Access Control (MAC) source address corresponding to the IP address of the first source host.

9. The universal VPN apparatus of claim 1, wherein the first packet payload in the first IP frame, the second packet payload in the second IP frame, or both the first packet payload and the second packet payload is unfragmented and comprises more bytes of payload data than is permitted for a packet payload in an Ethernet frame.

10. The universal VPN apparatus of claim 1, wherein universal the VPN apparatus comprises the second IP switch.

11. A method for transmitting a virtual private line services (VPLS) packet to destinations relating to at least one universal Virtual Private Network (VPN), said method comprising:
a first Internet Protocol (IP) switch receiving a first VPLS packet from a first source host at a first access port of the first IP switch to which the first source host is directly connected, wherein the first IP switch is connected to a second IP switch, wherein each IP switch independently comprises multiple ports comprising a plurality of access ports and an interswitch port, wherein each access port of each IP switch is identified by a port identifier and directly connected to a corresponding host, wherein the interswitch port of the first IP switch is connected to the interswitch port of the second IP switch via a communication path in a public telecommunications medium, wherein the plurality of access ports of the first IP switch comprises the first access port, wherein the first source host is a registered member of a first universal VPN, wherein the first VPLS packet comprises a header appended to a first IP frame comprising a packet payload having a first message therein, said header comprising a first VPN label identifying the first universal VPN, wherein each IP switch comprises a switching table comprising a plurality of entries, each entry comprising an IP address with an associated IP route, each entry further comprising an IP port identifier associated with the IP address and identifying a port of the multiple ports, wherein each IP switch comprises means for dynamically populating and updating the switching table in a dynamic learning procedure for entries pertaining to incoming IP frames at the access ports, and wherein the switching table cannot be dynamically populated and updated in a dynamic learning process for entries pertaining to the interswitch port;

after said receiving the first VPLS packet, said first IP switch reading the first VPN label from the first IP frame to identify the first universal VPN;

after said reading the first VPN label to identify the first universal VPN, said first IP switch identifying a plurality of ports comprising the interswitch port of the second IP switch and at least one access port of the first IP switch such that the plurality of ports is connected to a plurality of destination hosts which are registered members of the first universal VPN;

after said identifying the plurality of ports, said first IP switch transmitting the first VPLS packet to each port of the plurality of ports via a corresponding transmission path, using a VPLS transmission protocol throughout each corresponding transmission path.

12. The method of claim 11, wherein after the first VPLS packet transmitted to the interswitch port of the second IP switch has been received at the interswitch port of the second IP switch, said second IP switch is configured to route the first VPLS packet to each destination host of the plurality of destination hosts directly connected to a corresponding access port of the plurality of access ports of the second IP switch, using the VPLS transmission protocol; and wherein the method further comprises: after said transmitting the first VPLS packet to each access port of the least one access port of the first IP switch, said first IP switch routing the first VPLS packet from each access port of the least one access port of the first IP switch to each destination host of the plurality of destination hosts directly connected thereto, using the VPLS transmission protocol.

13. The method of claim 11, wherein each IP switch further comprises a switching table comprising a plurality of entries, each entry comprising an IP address with an associated IP route, each entry further comprising an IP port identifier associated with the IP address and identifying a port of the multiple ports, said switching table configured to be dynamically populated and updated in a dynamic learning procedure for entries pertaining to the access ports, said switching table not configured to be dynamically populated and updated in a dynamic learning process for entries pertaining to the interswitch port;

wherein the IP route in the entry of the switching table of the first IP switch corresponding to the first access port is flagged with the first VPN label;

wherein the IP route in the entry of the switching table of each access port of the at least one access port of the first IP switch is flagged with the first VPN label; and wherein the IP route, in the entry of the switching table of the first IP switch for an IP subnet whose next interface is the interswitch port of the second IP switch, is flagged with the first VPN label in conjunction with the access ports of the plurality of access ports of the second IP switch to which destination hosts of the plurality of destination hosts are directly connected.

14. The method of claim 11, wherein the first IP switch does not comprise a Media Access Control (MAC) table that associates a MAC address of the first source host with the first source host's port identifier of the first access port.

15. The method of claim 11, wherein the first IP frame comprises an IP address of the first source host and does not comprise a Media Access Control (MAC) source address corresponding to the IP address of the first source host.

16. The method of claim 11, wherein the packet payload in the first IP frame is unfragmented and comprises more bytes of payload data than is permitted for a packet payload in an Ethernet frame.

17. A computer program product comprising a storage medium having computer readable program code stored therein, said storage medium not being a signal, said program code configured to be executed by a computer to perform a method for transmitting a virtual private line services (VPLS) packet to destinations relating to at least one universal Virtual Private Network (VPN), said method comprising:

a first Internet Protocol (IP) switch receiving a first VPLS packet from a first source host at a first access port of the first IP switch to which the first source host is directly connected, wherein the first IP switch is connected to a second IP switch, wherein each IP switch independently comprises multiple ports comprising a plurality of access ports and an interswitch port, wherein each access port of each IP switch is identified by a port identifier and directly connected to a corresponding host, wherein the interswitch port of the first IP switch is connected to the interswitch port of the second IP switch via a communication path in a public telecommunications medium, wherein the plurality of access ports of the first IP switch comprises the first access port, wherein the first source host is a registered member of a first universal VPN, wherein the first VPLS packet comprises a header appended to a first IP frame comprising a packet payload having a first message therein, said header comprising a first VPN label identifying the first universal VPN, wherein each IP switch comprises a switching table comprising a plurality of entries, each entry comprising an IP address with an associated IP route, each entry further comprising an IP port identifier associated with the IP address and identifying a port of the multiple ports, wherein each IP switch comprises means for dynamically populating and updating the switching table in a dynamic learning procedure for entries pertaining to incoming IP frames at the access ports, and wherein the switching table cannot be dynamically populated and updated in a dynamic learning process for entries pertaining to the interswitch port;

after said receiving the first VPLS packet, said first IP switch reading the first VPN label from the first IP frame to identify the first universal VPN;

after said reading the first VPN label to identify the first universal VPN, said first IP switch identifying a plurality of ports comprising the interswitch port of the second IP switch and at least one access port of the first IP switch such that the plurality of ports is connected to a plurality of destination hosts which are registered members of the first universal VPN;

after said identifying the plurality of ports, said first IP switch transmitting the first VPLS packet to each port of the plurality of ports via a corresponding transmission path, using a VPLS transmission protocol throughout each corresponding transmission path.

18. The computer program product of claim 17, wherein after the first VPLS packet transmitted to the interswitch port of the second IP switch has been received at the interswitch port of the second IP switch, said second IP switch is configured to route the first VPLS packet to each destination host of the plurality of destination hosts directly connected to a corresponding access port of the plurality of access ports of the second IP switch, using the VPLS transmission protocol; and wherein the method further comprises: after said transmitting the first VPLS packet to each access port of the least one access port of the first IP switch, said first IP switch routing the first VPLS packet from each access port of the least one access port of the first IP switch to each destination host of the plurality of destination hosts directly connected thereto, using the VPLS transmission protocol.

19. The computer program product of claim 17, wherein each IP switch further comprises a switching table comprising a plurality of entries, each entry comprising an IP address with an associated IP route, each entry further comprising an IP port identifier associated with the IP address and identifying a port of the multiple ports, said switching table configured to be dynamically populated and updated in a dynamic learning procedure for entries pertaining to the access ports, said switching table not configured to be dynamically populated and updated in a dynamic learning process for entries pertaining to the interswitch port;

wherein the IP route in the entry of the switching table of the first IP switch corresponding to the first access port is flagged with the first VPN label;

wherein the IP route in the entry of the switching table of each access port of the at least one access port of the first IP switch is flagged with the first VPN label; and wherein the IP route, in the entry of the switching table of the first IP switch for an IP subnet whose next interface is the interswitch port of the second IP switch, is flagged with the first VPN label in conjunction with the access ports of the plurality of access ports of the second IP switch to which destination hosts of the plurality of destination hosts are directly connected.

20. The computer program product of claim 17, wherein the first IP switch does not comprise a Media Access Control (MAC) table that associates a MAC address of the first source host with the first source host's port identifier of the first access port;

wherein the first IP frame comprises an IP address of the first source host and does not comprise a Media Access Control (MAC) source address corresponding to the IP address of the first source host; and wherein the packet payload in the first IP frame is unfragmented and comprises more bytes of payload data than is permitted for a packet payload in an Ethernet frame.

21. A system comprising a computer configured to execute program code stored in a storage medium to perform a method for transmitting a virtual private line services (VPLS) packet to destinations relating to at least one universal Virtual Private Network (VPN), said method comprising:

a first Internet Protocol (IP) switch receiving a first VPLS packet from a first source host at a first access port of the first IP switch to which the first source host is directly connected, wherein the first IP switch is connected to a second IP switch, wherein each IP switch independently comprises multiple ports comprising a plurality of access ports and an interswitch port, wherein each access port of each IP switch is identified by a port identifier and directly connected to a corresponding host, wherein the interswitch port of the first IP switch is connected to the interswitch port of the second IP switch via a communication path in a public telecommunications medium, wherein the plurality of access ports of the first IP switch comprises the first access port, wherein the first source host is a registered member of a first universal VPN, wherein the first VPLS packet comprises a header appended to a first IP frame comprising a packet payload having a first message therein, said header comprising a first VPN label identifying the first universal VPN, wherein each IP switch comprises a switching table comprising a plurality of entries, each entry comprising an IP address with an associated IP route, each entry further comprising an IP port identifier associated with the IP address and identifying a port of the multiple ports, wherein each IP switch comprises means for dynamically populating and updating the switching table in a dynamic learning procedure for entries pertaining to incoming IP frames at the access ports, and wherein the switching table cannot be dynamically populated and updated in a dynamic learning process for entries pertaining to the interswitch port;

after said receiving the first VPLS packet, said first IP switch reading the first VPN label from the first IP frame to identify the first universal VPN;

after said reading the first VPN label to identify the first universal VPN, said first IP switch identifying a plurality of ports comprising the interswitch port of the second IP switch and at least one access port of the first IP switch such that the plurality of ports is connected to a plurality of destination hosts which are registered members of the first universal VPN;

after said identifying the plurality of ports, said first IP switch transmitting the first VPLS packet to each port of the plurality of ports via a corresponding transmission path, using a VPLS transmission protocol throughout each corresponding transmission path.

22. The system of claim 21, wherein after the first VPLS packet transmitted to the interswitch port of the second IP switch has been received at the interswitch port of the second IP switch, said second IP switch is configured to route the first VPLS packet to each destination host of the plurality of destination hosts directly connected to a corresponding access port of the plurality of access ports of the second IP switch, using the VPLS transmission protocol; and wherein the method further comprises: after said transmitting the first VPLS packet to each access port of the least one access port of the first IP switch, said first IP switch routing the first VPLS packet from each access port of the least one access port of the first IP switch to each destination host of the plurality of destination hosts directly connected thereto, using the VPLS transmission protocol.

23. The system of claim 21, wherein each IP switch further comprises a switching table comprising a plurality of entries, each entry comprising an IP address with an associated IP route, each entry further comprising an IP port identifier associated with the IP address and identifying a port of the multiple ports, said switching table configured to be dynamically populated and updated in a dynamic learning procedure for entries pertaining to the access ports, said switching table not configured to be dynamically populated and updated in a dynamic learning process for entries pertaining to the interswitch port;

wherein the IP route in the entry of the switching table of the first IP switch corresponding to the first access port is flagged with the first VPN label;

wherein the IP route in the entry of the switching table of each access port of the at least one access port of the first IP switch is flagged with the first VPN label; and wherein the IP route, in the entry of the switching table of the first IP switch for an IP subnet whose next interface is the interswitch port of the second IP switch, is flagged with the first VPN label in conjunction with the access ports of the plurality of access ports of the second IP switch to which destination hosts of the plurality of destination hosts are directly connected.

24. The system of claim 21, wherein the first IP switch does not comprise a Media Access Control (MAC) table that associates a MAC address of the first source host with the first source host's port identifier of the first access port;

wherein the first IP frame comprises an IP address of the first source host and does not comprise a Media Access Control (MAC) source address corresponding to the IP address of the first source host; and wherein the packet payload in the first IP frame is unfragmented and comprises more bytes of payload data than is permitted for a packet payload in an Ethernet frame.

\* \* \* \* \*